United States Patent
Wiegman

(10) Patent No.: US 12,081,050 B2
(45) Date of Patent: Sep. 3, 2024

(54) SYSTEM FOR OVERVOLTAGE PROTECTION IN AN ELECTRIC AIRCRAFT AND A METHOD FOR ITS USE

(71) Applicant: BETA AIR, LLC, South Burlington, VT (US)

(72) Inventor: Herman Wiegman, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 111 days.

(21) Appl. No.: 17/870,927

(22) Filed: Jul. 22, 2022

(65) Prior Publication Data

US 2023/0135066 A1    May 4, 2023

Related U.S. Application Data

(63) Continuation-in-part of application No. 17/515,519, filed on Oct. 31, 2021, now Pat. No. 11,424,630.

(51) Int. Cl.

| | |
|---|---|
| *H02J 7/00* | (2006.01) |
| *B60L 3/04* | (2006.01) |
| *B60L 50/60* | (2019.01) |
| *B60L 53/16* | (2019.01) |
| *B64D 27/24* | (2006.01) |
| *B64D 47/00* | (2006.01) |
| *B64C 29/00* | (2006.01) |

(52) U.S. Cl.
CPC ............ *H02J 7/00308* (2020.01); *B60L 3/04* (2013.01); *B60L 50/60* (2019.02); *B60L 53/16* (2019.02); *B64D 27/24* (2013.01); *B64D 47/00* (2013.01); *H02J 7/0031* (2013.01); *H02J 7/0042* (2013.01); *H02J 7/0047* (2013.01); *B60L 2200/10* (2013.01); *B64C 29/0008* (2013.01)

(58) Field of Classification Search
CPC .... H02J 7/00308; H02J 7/0031; H02J 7/0042; H02J 7/0047; H02J 7/00; B60L 50/60; B60L 53/16; B60L 3/04; B60L 2200/10; B64D 27/24; B64D 47/00; B64C 29/0008; B64C 29/00
See application file for complete search history.

(56) References Cited

U.S. PATENT DOCUMENTS 10,322,824 B1    6/2019    Demont et al.
10,530,167 B2    1/2020    Yi et al.
(Continued)

FOREIGN PATENT DOCUMENTS

| CN | 108631344 B | * | 3/2021 | ............... H02J 3/32 |
| DE | 102017102657 A1 | | 8/2018 | |
| EP | 3790139 A1 | | 3/2021 | |

*Primary Examiner* — Robert L Deberadinis
(74) *Attorney, Agent, or Firm* — Hoffman Warnick LLC

(57) ABSTRACT

A system for overvoltage protection in an electric aircraft, and a method for its use. The system includes an energy storage element, an overvoltage protection device, a ground conductor, at least a current conductor, at least a sensor, and a controller. The overvoltage protection device is configured to control transmission of electrical power through the connector. The at least a sensor is configured to detect an output voltage of the connector. The controller is communicatively connected to the at least a sensor. The controller is configured to determine an overvoltage output, and activate the over based on detection of the overvoltage output.

18 Claims, 14 Drawing Sheets

(56) References Cited

U.S. PATENT DOCUMENTS

| | | |
|---|---|---|
| 10,559,861 B2 | 2/2020 | Zheng et al. |
| 10,581,256 B2 | 3/2020 | Jung et al. |
| 10,629,964 B2 | 4/2020 | Swaminathan et al. |
| 10,790,678 B2 | 9/2020 | Zheng et al. |
| 10,830,830 B2 | 11/2020 | Murata |
| 11,682,796 B2 * | 6/2023 | Lee ..................... B60L 3/0046 429/7 |
| 2018/0341309 A1 | 11/2018 | Sporck et al. |
| 2020/0067302 A1 | 2/2020 | Tsuchiya et al. |
| 2020/0274203 A1 | 8/2020 | Kirleis et al. |
| 2021/0226468 A1 | 7/2021 | Zagrodnik |
| 2021/0257693 A1 | 8/2021 | Lee |

\* cited by examiner

SYSTEM FOR OVERVOLTAGE PROTECTION IN AN ELECTRIC AIRCRAFT AND A METHOD FOR ITS USE

CROSS-REFERENCE TO RELATED APPLICATIONS

This application is a continuation-in-part of Nonprovisional application Ser. No. 17/515,519 filed on Oct. 31, 2021 and entitled "SYSTEM FOR OVERVOLTAGE PROTECTION IN AN ELECTRIC AIRCRAFT AND A METHOD FOR ITS USE," the entirety of which is incorporated herein by reference.

FIELD OF THE INVENTION

The present invention generally relates to the field of electric vehicles. In particular, the present invention is directed to a system for overvoltage protection in an electric aircraft and a method for its use.

BACKGROUND

Electric vehicles hold great promise in their ability to run using sustainably source energy, without increase atmospheric carbon associated with burning of fossil fuels. Perennial downsides associated with electric vehicles, include poor energy storage and therefore range of operation, as well as long times to recharge on board batteries.

SUMMARY OF THE DISCLOSURE

In an aspect, a system may include a connector, the connector having: one or more energy storage elements; one or more conductors; one or more mating components. System may also include an electric aircraft, the electric aircraft having: one or more ports, the one or more ports configured to receive the one or more mating components; an overvoltage protection device having one or more sensors configured to detect at least an output of the connector; and a controller communicatively connected to the one or more sensors, where the controller is configured to: determine an overvoltage output; and activate the overvoltage protection device based on detection of the overvoltage output. Other embodiments of this aspect include corresponding computer systems, apparatus, and computer programs recorded on one or more computer storage devices, each configured to perform the actions of the methods.

In another aspect, a method may include storing, electrical power in one or more energy storage elements. Method may also include conducting, by a conductor of a connector, output voltage and output current to one or more ports of an electric aircraft. Method may furthermore include controlling, by an overvoltage protection device, transmission of the electrical power through the connector. Method may in addition include detecting, by one or more sensors, at least an output of the connector. Method may moreover include determining, by a controller, an overvoltage output as a function of the at least an output of the connector. Method may also include activating, by the controller, the protection circuit based on detection of the overvoltage output. Other embodiments of this aspect include corresponding computer systems, apparatus, and computer programs recorded on one or more computer storage devices, each configured to perform the actions of the methods.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

At a high level, aspects of the present disclosure are directed to system for overvoltage protection in an electric aircraft and a method for its use, thereby facilitating recharging of electric vehicles without the threat of damages to electrical components from an overvoltage. In an embodiment, aspects relate specifically to a system for overvoltage protection in an electric aircraft. For example, the system may include an overvoltage protection device to protect at least the electric vehicle and the connector from potential power surges. As it is an overvoltage may occur while connector is connected to the electric vehicle port of an electric vehicle can cause significant damage to the vehicle and the connector, aspects of connector described herein provides an improvement of existing charging methods.

Aspects of the present disclosure can be used to connect with communication, control, and/or sensor signals associated with an electric vehicle during recharging, thereby allowing for monitoring of the recharge and feedback control of various recharging systems, for example power sources and overvoltage systems. Aspects of the present disclosure can also be used to verify functionality of electric vehicle recharging systems. This is so, at least in part, because certain electric vehicles, such as electric aircraft require highest assurance of technical processes associated with their maintenance. Therefore, in some cases, aspects relate to systems for verifying the performance of the overvoltage system and/or charging processes in between charges of electric vehicles Aspects of the present disclosure allow for a future where technological downsides associated with recharging of electric vehicles no-longer slow their adoption in any number of fields including in manned flight. Exemplary embodiments illustrating aspects of the present disclosure are described below in the context of several specific examples.

Figure 1:
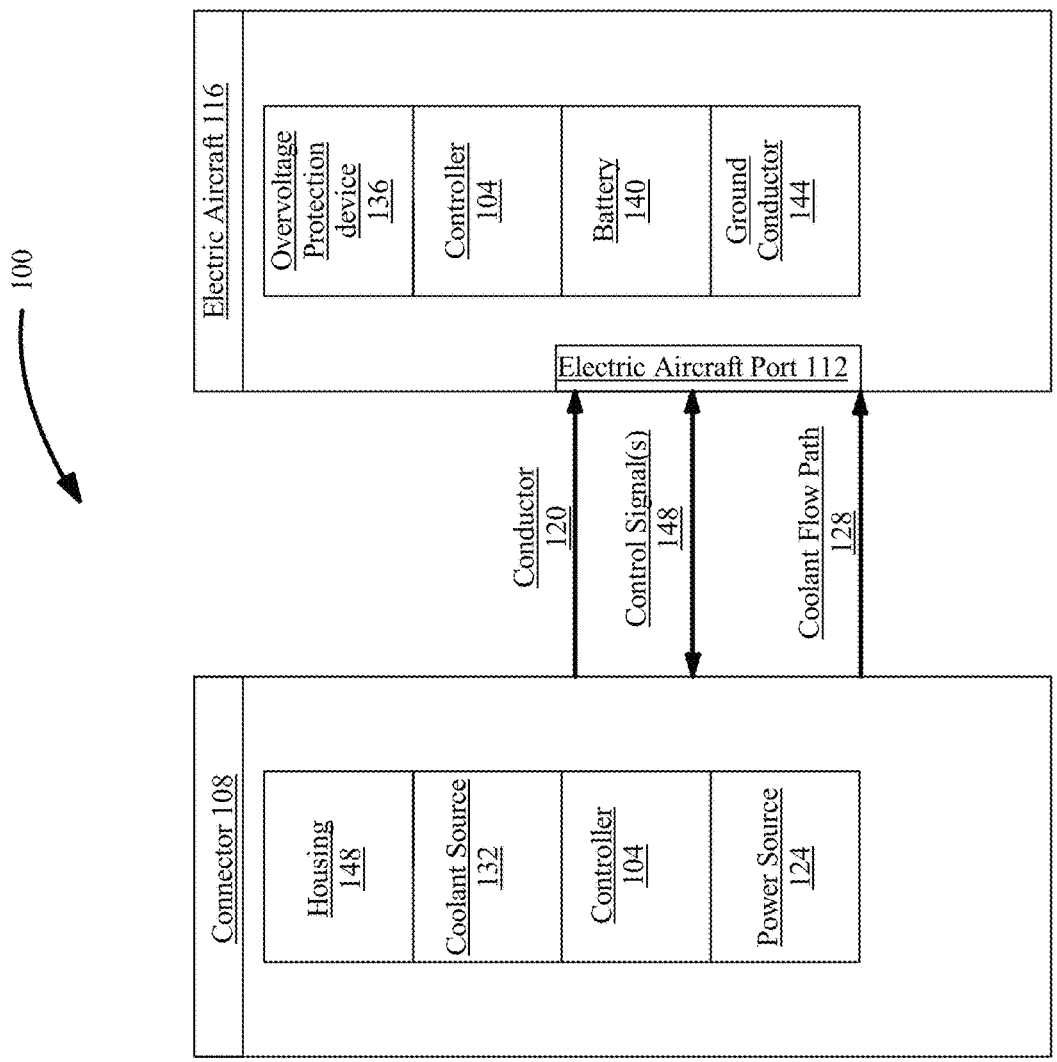
FIG. 1 is a block diagram illustrating an exemplary system for overvoltage protection in an electronic aircraft.

Referring now to FIG. 1, an exemplary embodiment of a system for overvoltage protection in an electric aircraft, the system including at least a control signal conductor configured to conduct a control signal. Some embodiments of system 100 may include a controller 104, which may be incorporated in an electric aircraft. As used in this disclosure, a "controller" is a logic circuit, such as an application-specific integrated circuit (ASIC), FPGA, microcontroller, and/or computing device that is configured to control a subsystem. A controller may also include any circuit element or combination thereof that activates the overvoltage protection circuit, including without limitation a diode, TRIAC, transistor, comparator, or the like that activates a blocking or shorting response in an overvoltage protection circuit. Controller 104 may include any computing device as described in this disclosure, including without limitation a microcontroller, microprocessor, digital signal processor (DSP) and/or system on a chip (SoC) as described in this disclosure. Controller 104 may include a digital or analog computing devices. For instance, Controller 104 may include but is not limited to various types of logic gates including combinatoric, sequential, synchronous, asynchronous. Controller 104 may also include an analog computing device such as a comparator operational amplifier or other operational amplifiers. Computing device may include, be included in, and/or communicate with a mobile device such as a mobile telephone or smartphone. Controller 104 may include a single via a network interface device. Network interface device may be utilized for connecting controller 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 104 may include but is not limited to, for example, a computing device or cluster of computing devices in a first location and a second computing device or cluster of computing devices in a second location. Controller 104 may include one or more computing devices dedicated to data storage, security, distribution of traffic for load balancing, and the like. Controller 104 may distribute one or more computing tasks as described below across a plurality of computing devices of computing device, which may operate in parallel, in series, redundantly, or in any other manner used for distribution of tasks or memory between computing devices. Controller 104 may be implemented using a "shared nothing" architecture in which data is cached at the worker, in an embodiment, this may enable scalability of system 100 and/or computing device.

With continued reference to FIG. 1, controller 104 may be designed and/or configured to perform any method, method step, or sequence of method steps in any embodiment described in this disclosure, in any order and with any degree of repetition. For instance, controller 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. controller 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 may include an electric vehicle port 112; electric vehicle port 112 may connect to a connector of a charger configured to charge the at least an energy storage device. As used in this disclosure, an "electric vehicle port" is an interface located on an electric vehicle, configured to receive another component. Additionally, the electric vehicle port 112 is located on an electric vehicle 116. As used in this disclosure, a "connector" is a distal end of a tether or a bundle of tethers, e.g., hose, tubing, cables, wires, and the like, which is configured to removably attach with a mating component, for example without limitation a port. For example, in the case of an electric vehicle port 112, the port interfaces with a number of conductors and/or a coolant flow path by way of receiving a connector. In the case of a computing device within electric vehicle port 112, the port may provide an interface between a signal and a computing device. A connector may include a male component having a penetrative form and electric vehicle port 112 may include a female component having a receptive form, receptive to the male component. Alternatively or additionally, connector may have a female component and electric vehicle port 112 may have a male component. In some cases, connector may include multiple connections, which may make contact and/or communicate with associated mating components within port, when the connector is mated with the port.

With continued reference to FIG. 1, connector 108 may include a housing. As used in this disclosure, a "housing" is a physical component within which other internal components are located. In some cases, internal components with housing will be functional while function of housing may largely be to protect the internal components. Housing and/or connector may be configured to mate with a port, for example an electrical vehicle port 112. As used in this disclosure, "mate" is an action of attaching two or more components together. Mating may be performed using a mechanical or electromechanical means described in this disclosure. For example, without limitation mating may include an electromechanical device used to join electrical conductors and create an electrical circuit. In some cases, mating may be performed by way of gendered mating components. A gendered mate may include a male component or plug which is inserted within a female component or socket. In some cases, mating may be removable. In some cases, mating may be permanent. In some cases, mating may be removable, but require a specialized tool or key for removal. Mating may be achieved by way of one or more of plug and socket mates, pogo pin contact, crown spring mates, and the like. In some cases, mating may be keyed to ensure proper alignment of connector 108. In some cases, mate may be lockable. As used in this disclosure, an "electric vehicle" is any electrically power means of human transport, for example without limitation an electric aircraft or electric vertical take-off and landing aircraft. In some cases, an electric vehicle will include an energy source configured to power at least a motor configured to move the electric vehicle 116. In some embodiments, electric vehicle port 112 may be consistent with any electric vehicle port disclosed in U.S. patent application Ser. No. 17/407,358, filed on Aug. 20, 2021, entitled "CONNECTOR AND METHOD FOR USE FOR AUTHORIZING BATTERY CHARGING FOR AN ELECTRIC VEHICLE," the entirety of which is hereby incorporated by reference. In some embodiments, electric vehicle port 112 may be consistent with any electric vehicle port disclosed in U.S. patent application Ser. No. 17/575,358, filed on Jan. 13, 2022, and entitled "APPARATUSES AND METHODS FOR CHARGING AN ELECTRIC AIRCRAFT," the entirety of which is hereby incorporated by reference.

With continued reference to FIG. 1, system 100 may include one or more conductors 120 having a distal end approximately located within electric aircraft. As used in this disclosure, a "conductor" is a component that facilitates conduction. As used in this disclosure, "conduction" is a process by which one or more of heat and/or electricity is transmitted through a substance, for example when there is a difference of effort (i.e., temperature or electrical potential) between adjoining regions. In some cases, a conductor 120 may be configured to charge and/or recharge an electric vehicle. For instance, conductor 120 may be connected to a power source 124 and conductor may be designed and/or configured to facilitate a specified amount of electrical power, current, or current type. For example, a conductor 120 may include a direct current conductor 120. As used in this disclosure, a "direct current conductor" is a conductor configured to carry a direct current for recharging an energy source 124. As used in this disclosure, "direct current" is one-directional flow of electric charge. In some cases, a conductor 120 may include an alternating current conductor 120. As used in this disclosure, an "alternating current conductor" is a conductor configured to carry an alternating current for recharging an energy source 124. As used in this disclosure, an "alternating current" is a flow of electric charge that periodically reverse direction; in some cases, an alternating current may change its magnitude continuously with in time (e.g., sine wave).

With continued reference to FIG. 1, system 100 may include a conductor 120 in electric communication with power source 124. As used in this disclosure, a "conductor" is a physical device and/or object that facilitates conduction, for example electrical conduction and/or thermal conduction. In some cases, a conductor may be an electrical conductor, for example a wire and/or cable. Exemplary conductor materials include metals, such as without limitation copper, nickel, steel, and the like. As used in this disclosure, "communication" is an attribute wherein two or more relata interact with one another, for example within a specific domain or in a certain manner. In some cases, communication between two or more relata may be of a specific domain, such as without limitation electric communication, fluidic communication, informatic communication, mechanic communication, and the like. As used in this disclosure, "electric communication" is an attribute wherein two or more relata interact with one another by way of an electric current or electricity in general. As used in this disclosure, "fluidic communication" is an attribute wherein two or more relata interact with one another by way of a fluidic flow or fluid in general. As used in this disclosure, "informatic communication" is an attribute wherein two or more relata interact with one another by way of an information flow or information in general. As used in this disclosure, "mechanic communication" is an attribute wherein two or more relata interact with one another by way of mechanical means, for instance mechanic effort (e.g., force) and flow (e.g., velocity)

With continued reference to FIG. 1, connector 108 may be electrically connected to a power source 124 configured to provide an electrical charging current. As used in this disclosure, a "power source" is a source of electrical power, for example a power grid. In some embodiments, a power grid may be external power grid. In some embodiments, a power grid may be configured to slowly charge one or more batteries in power source 124 in order to reduce strain on nearby electrical power grids. In one embodiment, power grid may have an AC grid current of at least 450 amps. In some embodiments, power grid may have an AC grid current of more than 450 amps. In some embodiments, power grid may have an AC grid current of less than 450 amps. In one embodiment, power grid may have an AC voltage connection of 480 Vac. In other embodiments, power grid may have an AC voltage connection of above or below 480 Vac. In some embodiments, power source 124 may provide power to the power grid. In this configuration, power source 124 may provide power to a surrounding electrical power grid. In some instances, where power source 124 is provided energy from may influence a maximum voltage and/or a maximum current. That is, an external power grid may have a higher potential voltage and/or current than charging battery, for instance. In another non-limiting example, power source 124 may include a charging battery (i.e., a battery used for charging other batteries. A charging battery is notably contrasted with an electric vehicle battery, which is located for example upon an electric aircraft. As used in this disclosure, an "electrical charging current" is a flow of electrical charge that facilitates an increase in stored electrical energy of an energy storage, such as without limitation a battery. Charging battery 124 may include a plurality of batteries, battery modules, and/or battery cells. Charging battery 124 may be configured to store a range of electrical energy, for example a range of between about 5 KWh and about 5,000 KWh. Power source 124 may house a variety of electrical components. In one embodiment, power source 124 may contain a solar inverter. Solar inverter may be configured to produce on-site power generation. In one embodiment, power generated from solar inverter may be stored in a charging battery. In some embodiments, charging battery may include a used electric vehicle battery no longer fit for service in a vehicle. Charging battery 116 may include any battery described in this disclosure, including with reference to FIGS. 5-12.

Still referring to FIG. 1, in a non-limiting embodiment, electric aircraft port 112 may be configured to support bidirectional charging. A "bidirectional charging," for the purpose of this disclosure, is a charging mode that allows for the flow of electricity to go two ways. In a non-limiting embodiment, charging connector 108 may provide electric energy to a battery pack 140 of an electric aircraft from a power source such as an electric grid and also receive electric energy from an electric aircraft and its battery pack 140. For example and without limitation, electric aircraft port 112 may act as a hub for the transfer of electrical energy. In a non-limiting embodiment, electric aircraft port 112 may be integrated into a system supporting vehicle-to-grid (V2G) charging. For example and without limitation, electric aircraft port 112 may be used to transfer electric energy from a battery pack 112 of an electric aircraft 104 to charge a power source and/or battery pack of a charging connector 108. Charging connector 108 may include a universal charger and/or common charger. For example and without limitation, charging connector 108 may draw power from a variety of input voltages. Persons skilled in the art, upon reviewing the entirety of this disclosure, will be aware of various configurations of the electric aircraft port 112 that may be utilized for various charging methodologies consistent with this disclosure. In some embodiments, an aircraft may charge a grid and/or batteries of a charger by utilizing "bidirectional charging" as disclosed in U.S. patent application Ser. No. 17/373,863, entitled "SYSTEM FOR CHARGING FROM AN ELECTRIC VEHICLE CHARGER TO AN ELECTRIC GRID," and filed Jul. 13, 2021, incorporated in its entirety by reference. In some embodiments, the electric grid may have a maximum grid current level. The maximum grid current level may be the maximum current that the electric grid is configured to receive from the electric aircraft. In som embodiments, the electric grid may have a maximum grid voltage level. In some embodiments, the maximum grid voltage level may be the maximum voltage that the electric grid is configured to receive from the electric aircraft.

In some embodiments, and still referring to FIG. 1, power source 124 may have a continuous power rating of at least 350 kVA. In other embodiments, power source 124 may have a continuous power rating of over 350 kVA. In some embodiments, power source 124 may have a battery charge range up to 950 Vdc. In other embodiments, power source 124 may have a battery charge range of over 950 Vdc. In some embodiments, power source 124 may have a continuous charge current of at least 350 amps. In other embodiments, power source 124 may have a continuous charge current of over 350 amps. In some embodiments, power source 124 may have a boost charge current of at least 500 amps. In other embodiments, power source 124 may have a boost charge current of over 500 amps. In some embodiments, power source 124 may include any component with the capability of recharging an energy source of an electric vehicle. In some embodiments, power source 124 may include a constant voltage charger, a constant current charger, a taper current charger, a pulsed current charger, a negative pulse charger, an IUI charger, a trickle charger, and a float charger.

In some embodiments, and still referring to FIG. 1, power source 124 may have a continuous power rating of at least 350 kVA. In other embodiments, power source 124 may have a continuous power rating of over 350 kVA. In some embodiments, power source 124 may have a battery charge range up to 950 Vdc. In other embodiments, power source 124 may have a battery charge range of over 950 Vdc. In some embodiments, power source 124 may have a continuous charge current of at least 350 amps. In other embodiments, power source 124 may have a continuous charge current of over 350 amps. In some embodiments, power source 124 may have a boost charge current of at least 500 amps. In other embodiments, power source 124 may have a boost charge current of over 500 amps. In some embodiments, power source 124 may include any component with the capability of recharging an energy source of an electric vehicle. In some embodiments, power source 124 may include a constant voltage charger, a constant current charger, a taper current charger, a pulsed current charger, a negative pulse charger, an IUI charger, a trickle charger, and a float charger.

With continued reference to FIG. 1, a conductor 120 may include a control signal conductor configured to conduct a control signal. As used in this disclosure, a "control signal conductor" is a conductor configured to carry a control signal between an electric vehicle and a charger. As used in this disclosure, a "control signal" is an electrical signal that is indicative of information. In this disclosure, "control pilot" is used interchangeably in this application with control signal conductor. In some cases, the control signal conductor may be operated by a controller. In some cases, a control signal may include an analog signal or a digital signal. In some cases, control signal may be communicated from one or more sensors, for example located within electric vehicle (e.g., within an electric vehicle battery) and/or located within connector 108. For example, in some cases, control signal may be associated with a battery within an electric vehicle. For example, control signal may include a battery sensor signal. As used in this disclosure, a "battery sensor signal" is a signal representative of a characteristic of a battery. In some cases, battery sensor signal may be representative of a characteristic of an electric vehicle battery, for example as electric vehicle battery is being recharged. In some versions, controller 104 may additionally include a sensor interface configured to receive a battery sensor signal. Sensor interface may include one or more ports, an analog to digital converter, and the like. Controller 104 may be further configured to control one or more of electrical charging current and coolant flow as a function of battery sensor signal and/or control signal. For example, controller 104 may control coolant source 132 and/or power source 124 as a function of battery sensor signal and/or control signal. In some cases, battery sensor signal may be representative of battery temperature. That is, the battery temperature may be monitored by battery sensor. In some cases, battery sensor signal may represent battery cell swell. In some cases, battery sensor signal may be representative of temperature of electric vehicle battery, for example temperature of one or more battery cells within an electric vehicle battery. In some cases, a sensor, a circuit, and/or a controller 104 may perform one or more signal processing steps on a signal. For instance, sensor, circuit, or controller 104 may analyze, modify, and/or synthesize a signal in order to improve the signal, for instance by improving transmission, storage efficiency, or signal to noise ratio.

With continued reference to FIG. 1, in some embodiments, at least a sensor is configured to detect output voltage of connector 108. Output voltage may be provided via current conductor(s) 116. Output voltage may pass through overvoltage protection device 136 or at least a part of it.

Output voltage may be the same or similar to charging voltage. Controller 104 is communicatively connected to sensor(s).

Still referring to FIG. 1, as used in this disclosure, a "sensor" is a device that is configured to detect a phenomenon and transmit information related to the detection of the phenomenon. For example, in some cases a sensor may transduce a detected phenomenon, such as without limitation, voltage, current, speed, direction, force, torque, temperature, pressure, and the like, into a sensed signal. Sensor may include one or more sensors which may be the same, similar or different. Sensor may include a plurality of sensors which may be the same, similar or different. Sensor may include one or more sensor suites with sensors in each sensor suite being the same, similar or different. In some embodiments of overvoltage protection device 136, the controller may sense the change in voltage and activate the overvoltage protection device in a single mechanism. In this embodiment the sensor may be considered a part of the controller 104. In some embodiments, one or more sensors may detect an output voltage level, an output current level, or any output from conductor 120. Further, one or more sensors may communicate an indication of output voltage level and output current level to controller 104. Controller 104 may compare output voltage level and output current level to a maximum voltage level and a maximum current level, respectively. In response to comparing the sensed outputs to their respective maximum values, controller 104 may communicate a signal to overvoltage protection device 136. In some instances, output voltage level may exceed a maximum voltage level. In the same instance, controller 104 may communicate a signal to overvoltage protection device 136 to dissipate excess voltage to ground conductor 144.

With continued reference to FIG. 1, exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Still referring to FIG. 1, in some embodiments, system 100 may additionally include an alternating current to direct current converter configured to convert an electrical charging current from an alternating current. As used in this disclosure, an "analog current to direct current converter" is an electrical component that is configured to convert analog current to digital current. An analog current to direct current (AC-DC) converter may include an analog current to direct current power supply and/or transformer. In some cases, AC-DC converter may be located within an electric vehicle and conductors may provide an alternating current to the electric vehicle by way of conductors 120 and connector 108. Alternatively and/or additionally, in some cases, AC-DC converter may be located outside of electric vehicle and an electrical charging current may be provided by way of a direct current to the electric vehicle. In some cases, AC-DC converter may be used to recharge a charging battery 124. In some cases, AC-DC converter may be used to provide electrical power to one or more of overvoltage device 136, power source 124, and/or controller 104. In some embodiments, power source 124 may have a connection to grid power component. Grid power component may be connected to an external electrical power grid. In some embodiments, grid power component may be configured to slowly charge one or more batteries in order to reduce strain on nearby electrical power grids. In one embodiment, grid power component may have an AC grid current of at least 450 amps. In some embodiments, grid power component may have an AC grid current of more or less than 450 amps. In one embodiment, grid power component may have an AC voltage connection of 480 Vac. In other embodiments, grid power component may have an AC voltage connection of above or below 480 Vac. In some embodiments, power source 124 may provide power to the grid power component. In this configuration, power source 124 may provide power to a surrounding electrical power grid.

With continued reference to FIG. 1, a conductor 120 may include a ground conductor 144. As used in this disclosure, a "ground conductor" is a conductor configured to be in electrical communication with a ground. As used in this disclosure, a "ground" is a reference point in an electrical circuit, a common return path for electric current, or a direct physical connection to the earth. Ground may include an absolute ground such as earth or ground may include a relative (or reference) ground, for example in a floating configuration.

With continued reference to FIG. 1, system 100 may include an overvoltage protection system 136. As used in this disclosure, an "overvoltage" is a when the electrical current that passes through an electrical device exceeds a given operating range due to a sharp rise in voltage within the circuit. The overvoltage protection system is used to protect at least the electric vehicle and its various electrical components from an overvoltage. This could result in an influx of heat throughout the system that will likely damage the electrical components of the system. For example, in some cases, the overvoltage protection device 136 is comprised of a device that dissipates excess voltage to ground when the voltage is outside of a given range. Exemplary examples of these overvoltage protection devices include without limitation, a metal oxide varistor (MOV), a transient voltage surge suppression diode/Zener diode, thyristor surge protection device, gas discharge tube, selenium voltage suppressor, carbon block spark gap overvoltage suppressor, quarter-wave coaxial surge arrestor, series mode (SM) surge suppressors, and the like.

Exemplary methods of overvoltage protection may include the use of a Crowbar circuit, Voltage clamping, and Zener Circuit. As used in this disclosure, a "Crowbar circuit" is an electrical circuit that works by sensing a voltage that is above a certain threshold by the use of an operational amplifier or some form of a logic gate. Once the determination that the voltage is too high shorting out the power supply. As used in this disclosure, "Voltage Clamping" specifies that a spike voltage will cause the protective components inside an overvoltage protection circuit to short or clamp. Voltage clamping may occur as a result of the use of an operation amplifier to determine when there is a voltage surge. Clamping will bind the upper or lower extreme of a waveform to a voltage level, once the voltage level is outside of a given value current will be clamped or shut off. As used in this disclosure, a "Zener Circuit" is any circuit that consists of at least a Zener diode for its primary method of overvoltage protection. For example, some embodiments of system 100 may contain Zener Circuit as its primary form of overvoltage protection device 136.

With continued reference to FIG. 1, in some embodiments, controller 104 is configured to determine overvoltage output within the system and activate the overvoltage protection device 136 based on a predetermined set of output voltages from the system. In some embodiments of system 100, controller 104 decides that an overvoltage has occurred by taking a reading the voltage within the system it will send a control signal 148 to trip the overvoltage protection device 136. Once the overvoltage protection device 136 is tripped all remaining voltage will be sent to ground conductor 144 or dissipated through the aircraft to ground.

Still referring to FIG. 1, in an embodiment, activating or actuating, by controller 104, overvoltage protection device 136 may include tripping overvoltage protection device 136.

Controller 104 may trip protection circuit 136 based on determination and/or detection of overvoltage output. Tripping overvoltage protection device 136 may include any mechanism to shut off electrical flow through connector 108 as a function of detection of overvoltage output. Tripping overvoltage protection device 136 may include, without limitation, use of any electrical switches or the like. As used herein, "tripping" is an act of disconnecting, shorting, and/or blocking a circuit to perform overvoltage protection. Tripping may involve automatically activating a mechanism, for example and without limitation, by using an electrical contact or switch, to shut-off electrical power as a precautionary or safety measure. Tripping may also include shorting or shunting circuits, which discharge electrical current by a low resistance bypass. In an embodiment, activating or actuating, by controller 104, overvoltage protection device 136 may include terminating transmission of electrical power through connector 108. In an embodiment, activating or actuating, by controller 104, overvoltage protection device 136 may include regulating output voltage. Regulation may involve decreasing (and in some cases, even increasing) the value of output voltage and/or charging voltage being outputted or emanating from connector 108.

Still referring to FIG. 1, in some embodiments, coolant source 132 may be further configured to transfer heat between coolant, for example coolant belonging to coolant flow, and an ambient air. As used in this disclosure, "ambient air" is air which is proximal a system and/or subsystem, for instance the air in an environment which a system and/or sub-system is operating. For example, in some cases, coolant source 132 comprises a heart transfer device between coolant and ambient air. Exemplary heat transfer devices include, without limitation, chillers, Peltier junctions, heat pumps, refrigeration, air conditioning, expansion or throttle valves, heat exchangers (air-to-air heat exchangers, air-to-liquid heat exchangers, shell-tube heat exchangers, and the like), vapor-compression cycle system, vapor absorption cycle system, gas cycle system, Stirling engine, reverse Carnot cycle system, and the like. In some versions, controller 104 may be further configured to control a temperature of coolant. For instance, in some cases, a sensor may be located within thermal communication with coolant, such that sensor is able to detect, measure, or otherwise quantify temperature of coolant within a certain acceptable level of precision. In some cases, sensor may include a thermometer. Exemplary thermometers include without limitation, pyrometers, infrared non-contacting thermometers, thermistors, thermocouples, and the like. In some cases, thermometer may transduce coolant temperature to a coolant temperature signal and transmit the coolant temperature signal to controller 104. Controller 104 may receive coolant temperature signal and control heat transfer between ambient air and coolant as a function of the coolant temperature signal. Controller 104 may use any control method and/or algorithm used in this disclosure to control heat transfer, including without limitation proportional control, proportional-integral control, proportional-integral-derivative control, and the like. In some cases, controller 104 may be further configured to control temperature of coolant within a temperature range below an ambient air temperature. As used in this disclosure, an "ambient air temperature" is temperature of an ambient air. An exemplary non-limiting temperature range below ambient air temperature is about −5° C. to about −30° C. In some embodiments, coolant flow may substantially be comprised of air. In some cases, coolant flow may have a rate within a range a specified range. A non-limiting exemplary coolant flow range may be about 0.1 CFM and about 100 CFM. In some cases, rate of coolant flow may be considered as a volumetric flow rate. Alternatively or additionally, rate of coolant flow may be considered as a velocity or flux. In some embodiments, coolant source 124 may be further configured to transfer heat between a heat source, such as without limitation ambient air or chemical energy, such as by way of combustion, and coolant, for example coolant flow. In some cases, coolant source 124 may heat coolant, for example above ambient air temperature, and/or cool coolant, for example below an ambient air temperature. In some cases, coolant source 124 may be powered by electricity, such as by way of one or more electric motors. Alternatively or additionally, coolant source 124 may be powered by a combustion engine, for example a gasoline powered internal combustion engine. In some cases, coolant flow may be configured, such that heat transfer is facilitated between coolant flow and at least a battery, by any methods known and/or described in this disclosure. In some cases, at least a battery may include a plurality of pouch cells. In some cases, heat is transferred between coolant flow and one or more components of at least a pouch cell, including without limitation electrical tabs, pouch and the like. In some cases, coolant flow may be configured to facilitate heat transfer between the coolant flow and at least a conductor of electric vehicle, including without limitation electrical busses within at least a battery.

Still referring to FIG. 1, in some embodiments, coolant source 132 may occur synchronously and/or asynchronously with charging. For example, in some case, coolant source 132 may be configured to provide a flow of coolant prior to charging a battery of an electric vehicle. In some embodiments, coolant flow path 128 may facilitate fluidic and/or thermal communication with coolant source 132 and at least a battery when connector 108 is connected to port 112. Alternatively and/or additionally, coolant flow path 128 may facilitate fluidic and/or thermal communication with coolant source 132 and a cabin and/or cargo-space of aircraft when connector 108 is connected to port 112. In some cases, a plurality of coolant flow paths 128, coolant sources 132, and/or connectors 108 may be used to connect to multiple components of an electric vehicle. In some cases, coolant source 132 may provide conditioned air in order to control an environmental temperature within an electric vehicle, such as an aircraft, for example without limitation for cargo, passengers, and/or crew. In some cases, coolant source 132 may pre-condition at least a vehicle battery. As used in this disclosure, "pre-conditioning" is an act of affecting a characteristic of a battery, for example battery temperature, pressure, humidity, swell, and the like, substantially prior to charging. For example and without limitation, coolant source 132 may be configured to pre-condition at least a battery prior to charging, by providing a coolant flow to the at least a battery and raising and/or lowering temperature of the at least a battery. As a further non-limiting example, pre-conditioning may occur for a predetermined time prior to charging (e.g., 1 min, 10 min, 1 hour, 4 hours, and the like). Alternatively or additionally, pre-conditioning may be feedback controlled, by way of at least a battery sensor, and occur until or for a predetermined time after a certain condition has been met, such as without limitation when at least a battery is within a desired temperature range. In some cases, coolant source 132 may be configured to pre-condition any space or component within a vehicle, such as an aircraft, including without limitation cargo space and cabin. In some cases, and without limitation, coolant source 132 may provide cooling to at least a battery after charging the at least a battery. In some cases, and without limitation, at least a machine-learning process may be used to determine and/or optimize parameters associated with cooling at least a battery. In some non-limiting cases, controller 104 may use at least a machine-learning process to optimize cooling time relative of current charging metrics, for example power source 124 parameters and/or sensor signals. Coolant source 132 may include any computing device described in this disclosure. Coolant source 132 and controller 104 may utilize any machine-learning process described in this disclosure.

With continued reference to FIG. 1, controller 104 may be configured to control one or more electrical charging current within conductor 120 and coolant flow within coolant flow path 124. For example, controller 104 may be configured to control one or more of coolant source 132 and/or power source 124. In some embodiments controller may control coolant source 132 and/or power source 124 according to a control signal. As used in this disclosure, "control signal" is any transmission from controller to a subsystem that may affect performance of subsystem. In some embodiments, control signal may be analog. In some cases, control signal may be digital. Control signal may be communicated according to one or more communication protocols, for example without limitation Ethernet, universal asynchronous receiver-transmitter, and the like. In some cases, control signal may be a serial signal. In some cases, control signal may be a parallel signal. Control signal may be communicated by way of a network, for example a controller area network (CAN). In some cases, control signal may include commands to operate one or more of coolant source 132 and/or power source 124. For example, in some cases, coolant source 132 may include a valve to control coolant flow and controller 104 may be configured to control the valve by way of control signal. In some cases, coolant source 132 may include a flow source (e.g., a pump, a fan, or the like) and controller 104 may be configured to control the flow source by way of control signal. In some cases, coolant source 132 may be configured to control a temperature of coolant and controller 104 may be configured to control a coolant temperature setpoint or range by way of control signal. In some cases, power source 124 may include one or electrical components configured to control flow of an electric recharging current or switches, relays, direct current to direct current (DC-DC) converters, and the like. In some case, power source 124 may include one or more circuits configured to provide a variable current source to provide electric recharging current, for example an active current source. Non-limiting examples of active current sources include active current sources without negative feedback, such as current-stable nonlinear implementation circuits, following voltage implementation circuits, voltage compensation implementation circuits, and current compensation implementation circuits, and current sources with negative feedback, including simple transistor current sources, such as constant currant diodes, Zener diode current source circuits, LED current source circuits, transistor current, and the like, Op-amp current source circuits, voltage regulator circuits, and curpistor tubes, to name a few. In some cases, one or more circuits within power source 124 or within communication with power source 124 are configured to affect electrical recharging current according to control signal from controller 104, such that the controller 104 may control at least a parameter of the electrical charging current. For example, in some cases, controller 104 may control one or more of current (Amps), potential (Volts), and/or power (Watts) of electrical charging current by way of control signal. In some cases, controller 104 may be configured to selectively engage electrical charging current, for example ON or OFF by way of control signal.

With continued reference to FIG. 1, connector 108 may be configured such that one or more of conductor 120 and a coolant flow path 128 make a connection with a mating component on within an electric vehicle port 112 when the connector 108 is mated with the electric vehicle port 112. As used in this disclosure, a "mating component" is a component that is configured to mate with at least another component, for example in a certain (i.e., mated) configuration. In some configurations of system 100 the electric vehicle port 112 may be configured to accept the mating component of connector 108. The electric vehicle port 112 may also be configured to receive electricity through conductor 120 and coolant via the coolant flow path 128 through its mating with connector 108.

Still referring to FIG. 1, in some embodiments, system 100 may additionally include an isolation monitor conductor configured to conduct an isolation monitoring signal. In some cases, power systems for example power source 124 or electric vehicle batteries must remain electrically isolated from communication, control, and/or sensor signals. As used in this disclosure, "isolation" is a state where substantially no communication of a certain type is possible between to components, for example electrical isolation refers to elements which are not in electrical communication. Often signal carrying conductors and components (e.g., sensors) may need to be in relatively close proximity with power systems and/or power carrying conductors. For instance, battery sensors which sense characteristics of batteries, for example batteries within an electric vehicle, are often by virtue of their function placed in close proximity with a battery. A battery sensor that measures battery charge and communicates a signal associated with battery charge back to controller 104 is at risk of becoming un-isolated from the battery. In some cases, an isolation monitoring signal will indicate isolation of one or more components. In some cases, an isolation monitoring signal may be generated by an isolation monitoring sensor. Isolation monitoring sensor may include any sensor described in this disclosure, such as without limitation a multi-meter, an impedance meter, and/or a continuity meter. In some cases, isolation from an electrical power (e.g., battery and/or power source 124) may be required for housing of connector 108 and a ground. Isolation monitoring signal may, in some cases, communication information about isolation between an electrical power and ground, for example along a flow path that includes connector 108.

Still referring to FIG. 1, in some embodiments, system 100 may additionally include a coolant flow path 128 being located proximal or otherwise in thermal communication with one or more conductors 120, for example direct current conductor 120 and/or alternating current conductor 120. In some cases, heat generated within one or more conductors 120 may be transferred into coolant within coolant flow path 128. In some cases, coolant flow path 128 may be arranged substantially coaxial with one or more conductors 120, such that coolant flows substantially parallel with an axis of the one or more conductors 120. Alternatively or additionally, in some cases, coolant flow path 128 may be arranged in cross flow with one or more conductors 120. In some cases, system 100 may include a heat exchanged configured to extract heat from one or more conductors 120, for example at a location of high current and/or high impedance (e.g., resistance) within conductor. In some cases, generated heat within a conductor 120 may be proportional to current within conductor squared. Heating within a conductor 120 may be understood according to Joule heating, also referred to in this disclosure as resistive, resistance, or Ohmic heating. Joule-Lenz law states that power of heat generated by a conductor 120 is proportional to a product of conductor 120 resistance and a square of current within the conductor 120, see below.

Still referring to FIG. 1, in some embodiments, one or more of at least a direct current conductor 120 and at least an alternating current conductor 120 may be further configured to conduct a communication signal and/or control signal by way of power line communication. In some cases, controller 104 may be configured within communication of communication signal, for example by way of a power line communication modem. As used in this disclosure, "power line communication" is process of communicating at least a communication signal simultaneously with electrical power transmission. In some cases, power line communication may operate by adding a modulated carrier signal (e.g., communication signal) to a power conductor 120. Different types of power-line communications use different frequency bands. In some case, alternating current may have a frequency of about 50 or about 60 Hz. In some cases, power conductor 120 may be shielded in order to prevent emissions of power line communication modulation frequencies. Alternatively or additionally, power line communication modulation frequency may be within a range unregulated by radio regulators, for example below about 500 KHz.

As used in this disclosure, "verification" is a process of ensuring that which is being "verified" complies with certain constraints, for example without limitation system requirements, regulations, and the like. In some cases, verification may include comparing a product, such as without limitation charging or cooling performance metrics, against one or more acceptance criteria. For example, in some cases, charging or cooling performance metrics, may be required to function according to prescribed constraints or specification. Ensuring that charging or cooling performance metrics are in compliance with acceptance criteria may, in some cases, constitute verification. In some cases, verification may include ensuring that data (e.g., performance metric data) is complete, for example that all required data types, are present, readable, uncorrupted, and/or otherwise useful for controller 104. In some cases, some or all verification processes may be performed by controller 104. In some cases, at least a machine-learning process, for example a machine-learning model, may be used to verify. Controller 104 may use any machine-learning process described in this disclosure for this or any other function. In some embodiments, at least one of validation and/or verification includes without limitation one or more of supervisory validation, machine-learning processes, graph-based validation, geometry-based validation, and rules-based validation.

Still referring to FIG. 1, system 100 includes battery submodules electrically connected to a power bus element. "power bus element", for the purposes of this disclosure, is any common connection in electrical parlance to which any number of loads, which may be connected in parallel, and share a relatively similar voltage may be electrically coupled. Power bus element may refer to power busses, audio busses, video busses, computing address busses, and/or data busses. Power bus element may be responsible for conveying electrical energy stored in battery submodules to at least a portion of the electric aircraft 116. The same or a distinct power bus element may additionally or alternatively responsible for conveying electrical signals generated by any number of components within battery submodule to any destination on or offboard electric aircraft 116. An end cap may comprise wiring or conductive surfaces only in portions required to electrically couple Power bus element to electrical power or necessary circuits to convey that power or signals to their destinations. In some variations, power bus element may be charged via conductor 120 and subsequently the power source 124. Power bus element may include any bus element as described in U.S. Nonprovisional application Ser. No. 17/348,240, filed on Jun. 15, 2021, and entitled "SYSTEM AND METHOD FOR DYNAMIC EXCITATION OF AN ENERGY STORAGE ELEMENT CONFIGURED FOR USE IN AN ELECTRIC AIRCRAFT," the entirety of which is incorporated herein by reference.

Figure 2:
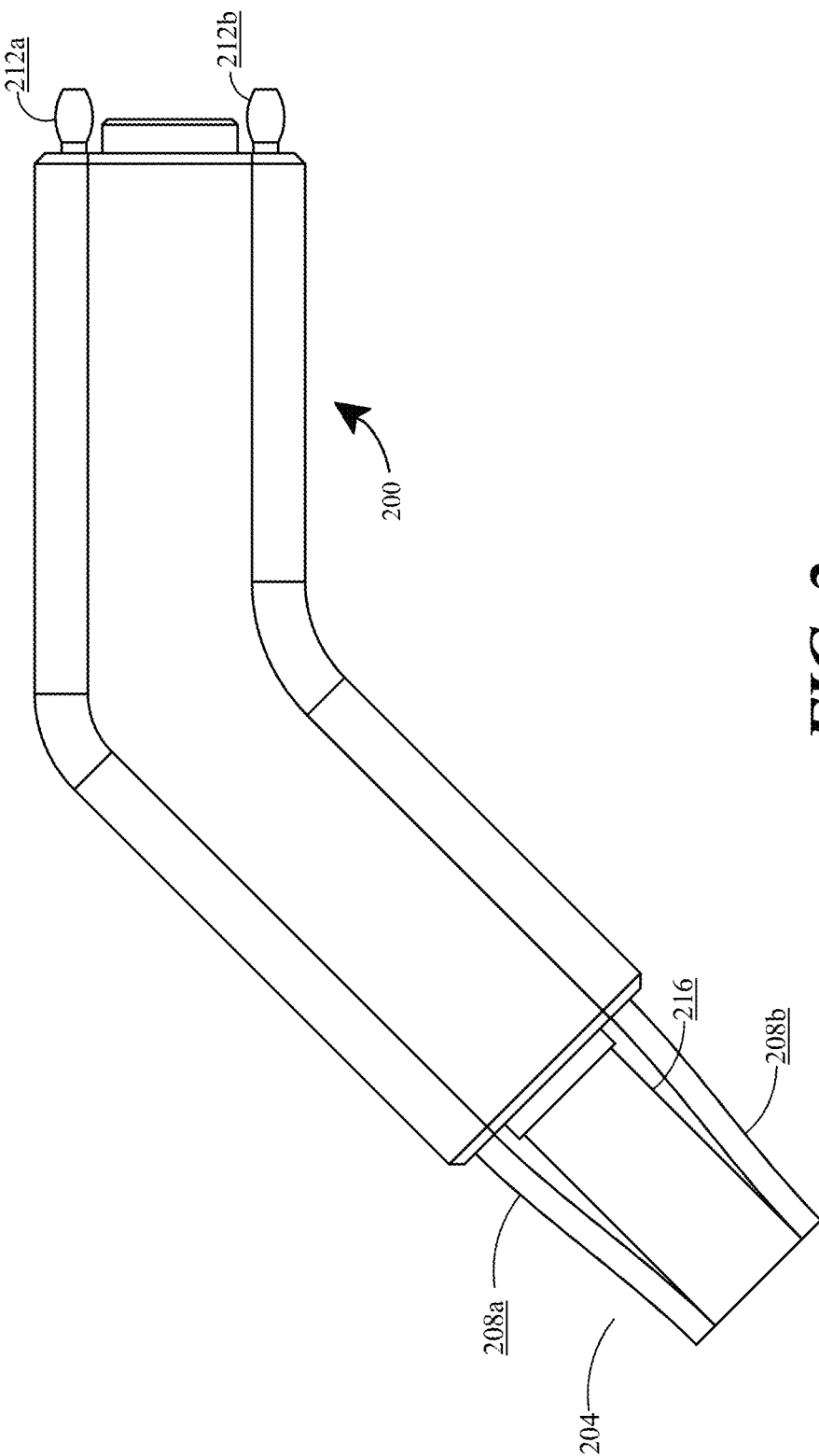
FIG. 2 illustrates an exemplary schematic of an exemplary connector for charging an electric vehicle.

Referring now to FIG. 2, an exemplary connector 200 is schematically illustrated. Connector 200 is illustrated with a tether 204. Tether 204 may include one or more conductors and/or coolant flow paths. Tether 204 may include a conduit, for instance a jacket, enshrouding one or more conductors and/or coolant flow paths. In some cases. conduit may be flexible, electrically insulating, and/or fluidically sealed. As shown in FIG. 2, exemplary connector 200 is shown with a first power conductor and a second power conductor. As used in this disclosure, a "power conductor" is a conductor configured to conduct an electrical charging current, for example a direct current and/or an alternating current. In some cases, a conductor may include a cable and a contact.

A cable may include any electrically conductive material including without limitation copper and/or copper alloys. As used in this disclosure, a "contact" is an electrically conductive component that is configured to make physical contact with a mating electrically conductive component, thereby facilitating electrical communication between the contact and the mating component. In some cases, a contact may be configured to provide electrical communication with a mating component within a port. In some cases, a contact may contain copper and/or copper-alloy. In some cases, contact may include a coating. A contact coating may include without limitation hard gold, hard gold flashed palladium-nickel (e.g., 80/20), tin, silver, diamond-like carbon, and the like.

With continued reference to FIG. 2, a first conductor may include a first cable 208a and a first contact 212a in electrical communication with the first cable. Likewise, a second conductor may include a second cable 208b and a second contact 212b in electrical communication with the second cable. In some cases, connector 200 may also include a coolant flow path 216. In some cases, connector 200 may include a plurality of coolant flow paths for example a coolant supply and a coolant return. Alternatively, in some cases, connector 200 may include one coolant flow path 216, for example without limitation when coolant supplied is a gas or is not returned to coolant source. In some cases, coolant flow path 216 may be located in thermal communication with a cable 208a-b, thereby allowing coolant to cool the cable 208a-b. In some cases, coolant flow path 216 may be located within thermal communication with a contact 212a-b, thereby allowing coolant to cool the contacts 212a-b.

Figure 3:
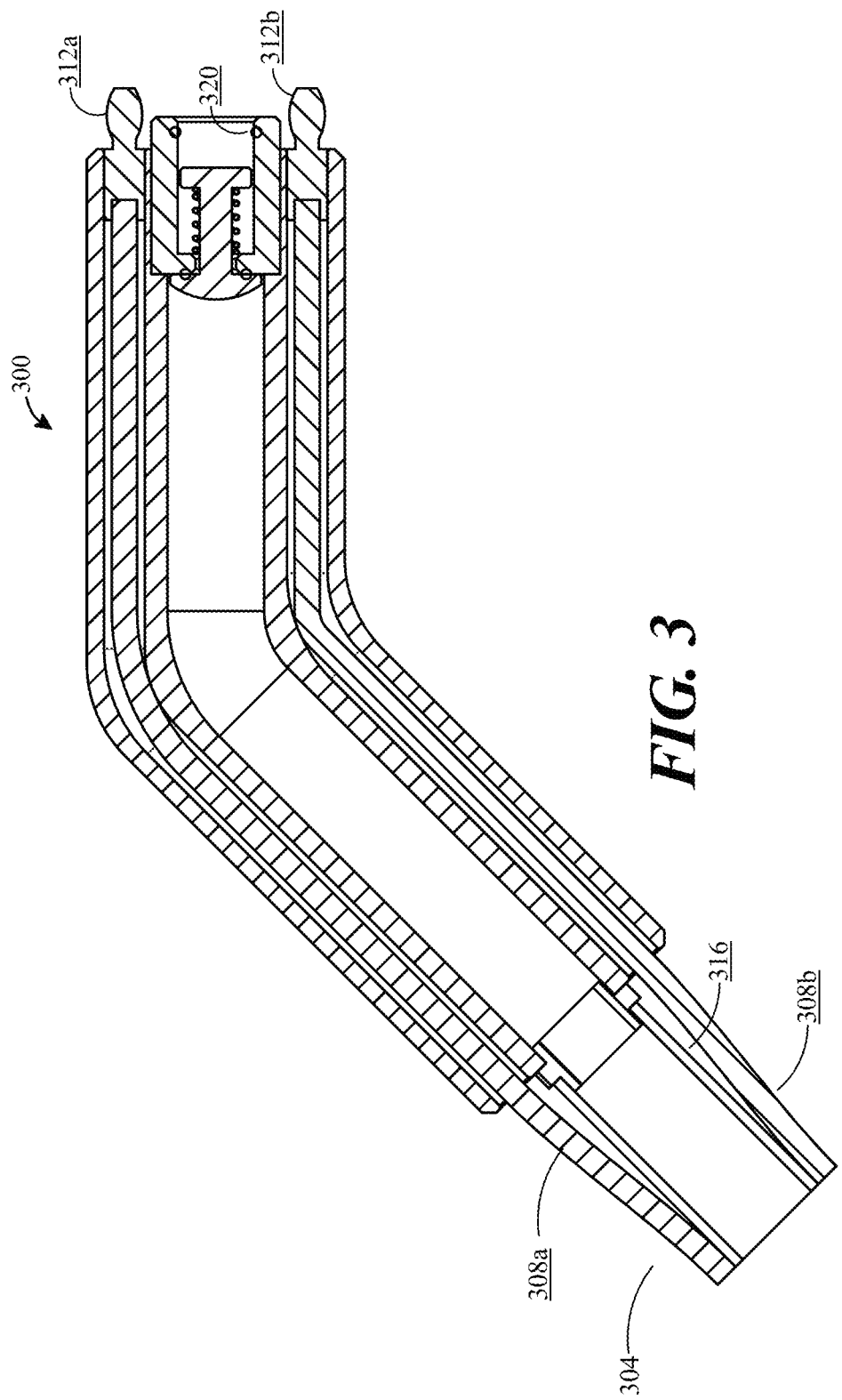
FIG. 3 is a cross-sectional view of an exemplary schematic of an exemplary connector for charging an electric vehicle.

Referring now to FIG. 3, an exemplary cross-sectional view of an exemplary connector 300 is illustrated. Connector 300 is illustrated with a tether 304. Tether 304 may include one or more conductors and/or coolant flow paths. Connector 300 is shown with a first power conductor and a second power conductor. A first conductor may include a first cable 308a and a first contact 312a in electrical communication with the first cable. Likewise, a second conductor may include a second cable 308b and a second contact 312b in electrical communication with the second cable. Connector 300 may also include a coolant flow path 316.

As shown in FIG. 3, in some cases, coolant flow path 316 may be configured to mate with a port. For example, coolant flow path 316 may include a fitting within connector 300. In some cases, fitting may include one or more seals 320. Seals may include any seal described in this disclosure and may be configured to seal a joint between coolant flow path 316 and a mating component (e.g., fitting and/or additionally coolant flow path) within port, when connector is attached to the port. As used in this disclosure, a "seal" is a component that is substantially impermeable to a substance (e.g., coolant, air, and/or water) and is designed and/or configured to prevent flow of that substance at a certain location, e.g., joint. Seal may be configured to seal coolant. In some cases, seal may include at least one of a gasket, an O-ring, a mechanical fit (e.g., press fit or interference fit), and the like. In some cases, seal may include an elastomeric material, for example without limitation silicone, buna-N, fluoroelastomer, fluorosilicone, polytetrafluoroethylene, polyethylene, polyurethane, rubber, ethylene propylene diene monomer, and the like. In some cases, seal may include a compliant element, such as without limitation a spring or elastomeric material, to ensure positive contact of seal with a sealing face. In some cases, seal may include a piston seal and/or a face seal. As used in this disclosure, a "joint" is a transition region between two components. For example in some cases, a coolant flow path may have a joint located between connector and electric vehicle port.

With continued reference to FIG. 3, in some embodiments, coolant flow path 316 may include a valve 324. Valve 324 may include any type of valve, for example a mechanical valve, an electrical valve, a check valve, or the like. In some cases, valve 324 may include quick disconnect. In some cases, valve 324 may include a normally closed vale, for example a mushroom-poppet style valve, as shown in FIG. 3. Additional non-limiting examples of normally closed valves include solenoid valves, a spring-loaded valve, and the like. In some cases, a valve may include one or more of ball valves, a butterfly valve, a body valve, a bonnet valve, a port valve, an actuator valve, a disc valve, a seat valve, a stem valve, a gasket valve, a trim valve, or the like. In some cases, valve 324 may be configured to open when connector is attached to port and/or when coolant flow path 316, in particular, is mated with a mating component within port. In some cases, valve 324 may be automatically opened/closed, for example by a controller 104. As described in more detail below, in some exemplary embodiments, mating of certain components within connector and port occur in prescribed sequence. For example, in some cases, coolant flow path 316 may first be mated and sealed to its mating component within a port, before a valve 324 is opened and/or one or more conductors 31a-b are mated to their respective mating components within the port. In some cases, valve 324 may be configured not to open until after connection of one or more conductors 312a-b. In some embodiments, connector 300 may provide coolant by way of coolant flow path 316 to port. Alternatively or additionally, in some embodiments, connector may include a coolant flow path which is substantially closed and configured to cool one or more conductors.

Figure 4:
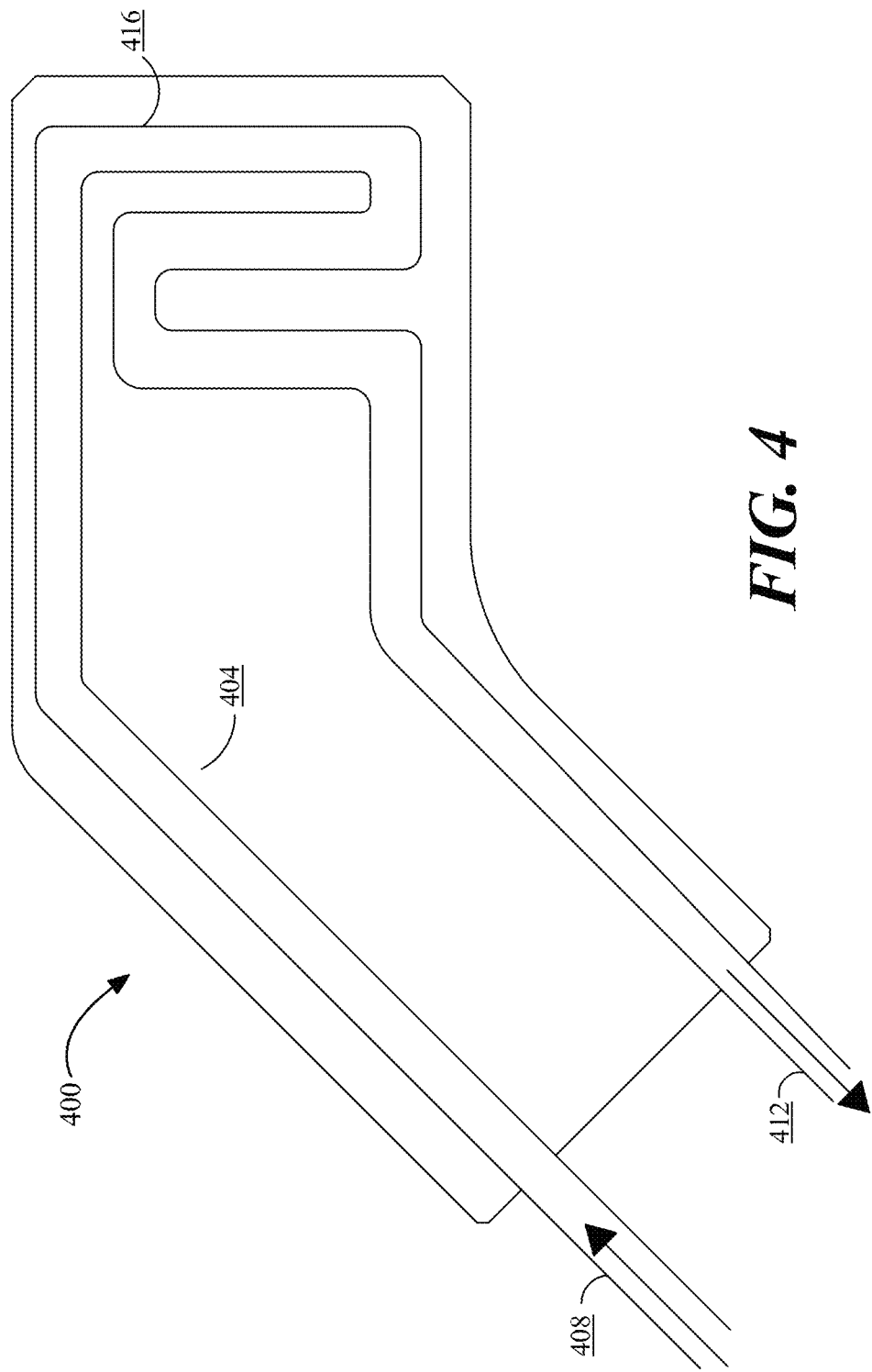
FIG. 4 illustrates an exemplary coolant flow path within an exemplary connector.

Referring now to FIG. 4, an exemplary connector 400 is shown. In some embodiments, connector 400 may include a coolant flow path 404. In some cases, coolant flow path 404 may be substantially sealed within connecter 400. For example, in some cases, a coolant flow 404 path may not be mated to a mating component, such as a fluidic fitting or flow path, when connecter 400 is attached to a port. In some cases, a coolant flow path 404 within connector 400 may include a coolant supply 408, a coolant return 412, and/or a heat exchanger 416. In some cases, coolant supply 408 is configured to contain and direct a flow of coolant substantially toward and within connector 400; coolant return is configured to contain and direct the flow of coolant substantially away from connector 400; and heat exchanger 416 is configured to transfer heat from at least a portion (or component of connector) into the flow of coolant. In some cases, heat exchanger 416 may be located proximal and/or within thermal conductivity of at least one conductor, cable, and/or contact, for example a power conductor. As described above, connector 400 may include one or more temperature sensors configured to detect a temperature and transmit a signal representative of that temperature, for example to a controller 104. In some cases, at least a temperature sensor may be located within thermal communication of one or more of a conductor, a cable, and/or a contact and controller 104 may control one or more aspects of a flow of coolant and/or electrical charging current as a function of the detected temperature. In some cases, connector 400 may include a plurality of coolant flow paths, for example a first coolant flow path 404 that is substantially sealed and a second coolant flow path 316 that is configured to be in fluidic communication with a mating component when connector 400 is attached to a port. In some cases, a first coolant flow path 404 may be in thermal communication, for example by way of a heat exchanger, with a second coolant flow path 316, such that coolant of the second coolant flow path 316 may be cooled by coolant of the first coolant flow path 404.

Figure 5:
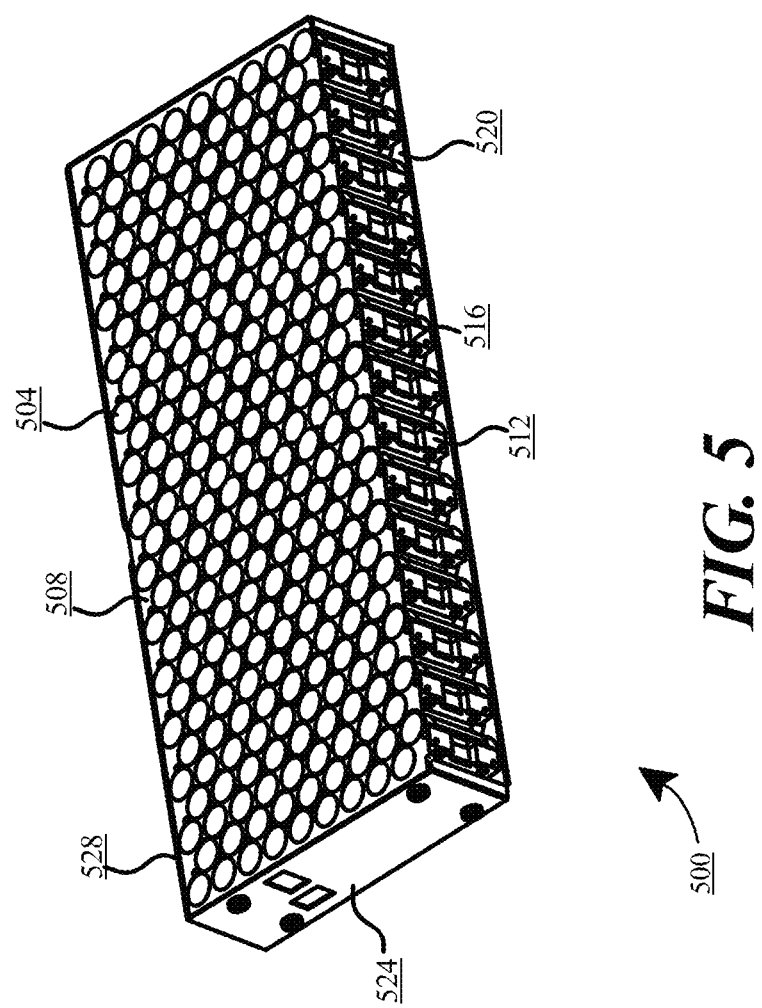
FIG. 5 schematically illustrates an exemplary battery module.

Referring now to FIG. 5, battery module 500 with multiple battery units 516 is illustrated, according to embodiments. Battery module 500 may comprise a battery cell 504, cell retainer 508, cell guide 512, protective wrapping, back plate 520, end cap 524, and side panel 528. Battery module 500 may comprise a plurality of battery cells, an individual of which is labeled 504. In embodiments, battery cells 504 may be disposed and/or arranged within a respective battery unit 516 in groupings of any number of columns and rows. For example, in the illustrative embodiment of FIG. 5, battery cells 504 are arranged in each respective battery unit 516 with 18 cells in two columns. It should be noted that although the illustration may be interpreted as containing rows and columns, that the groupings of battery cells in a battery unit, that the rows are only present as a consequence of the repetitive nature of the pattern of staggered battery cells and battery cell holes in cell retainer being aligned in a series. While in the illustrative embodiment of FIG. 5 battery cells 504 are arranged 18 to battery unit 516 with a plurality of battery units 516 comprising battery module 500, one of skill in the art will understand that battery cells 504 may be arranged in any number to a row and in any number of columns and further, any number of battery units may be present in battery module 500. According to embodiments, battery cells 504 within a first column may be disposed and/or arranged such that they are staggered relative to battery cells 504 within a second column. In this way, any two adjacent rows of battery cells 504 may not be laterally adjacent but instead may be respectively offset a predetermined distance. In embodiments, any two adjacent rows of battery cells 504 may be offset by a distance equal to a radius of a battery cell. This arrangement of battery cells 504 is only a non-limiting example and in no way preclude other arrangement of battery cells.

In embodiments, battery cells 504 may be fixed in position by cell retainer 508. For the illustrative purposed within FIG. 5, cell retainer 508 is depicted as the negative space between the circles representing battery cells 504. Cell retainer 508 comprises a sheet further comprising circular openings that correspond to the cross-sectional area of an individual battery cell 504. Cell retainer 508 comprises an arrangement of openings that inform the arrangement of battery cells 504. In embodiments, cell retainer 508 may be configured to non-permanently, mechanically couple to a first end of battery cell 504.

According to embodiments, battery module 500 may further comprise a plurality of cell guides 512 corresponding to each battery unit 516. Cell guide 512 may comprise a solid extrusion with cutouts (e.g. scalloped) corresponding to the radius of the cylindrical battery cell 504. Cell guide 512 may be positioned between the two columns of a battery unit 516 such that it forms a surface (e.g. side surface) of the battery unit 516. In embodiments, the number of cell guides 512 therefore match in quantity to the number of battery units 516. Cell guide 512 may comprise a material suitable for conducting heat.

Battery module 500 may also comprise a protective wrapping woven between the plurality of battery cells 504. Protective wrapping may provide fire protection, thermal containment, and thermal runaway during a battery cell malfunction or within normal operating limits of one or more battery cells 504 and/or potentially, battery module 500 as a whole. Battery module 500 may also comprise a backplate 520. Backplate 520 is configured to provide structure and encapsulate at least a portion of battery cells 504, cell retainers 508, cell guides 512, and protective wraps. End cap 524 may be configured to encapsulate at least a portion of battery cells 504, cell retainers 508, cell guides 512, and battery units 516, as will be discussed further below, end cap may comprise a protruding boss that clicks into receivers in both ends of back plate 520, as well as a similar boss on a second end that clicks into sense board. Side panel 528 may provide another structural element with two opposite and opposing faces and further configured to encapsulate at least a portion of battery cells 504, cell retainers 508, cell guides 512, and battery units 516.

Still referring to FIG. 5, in embodiments, battery module 500 can include one or more battery cells 504. In another embodiment, battery module 500 comprises a plurality of individual battery cells 504. Battery cells 504 may each comprise a cell configured to include an electrochemical reaction that produces electrical energy sufficient to power at least a portion of an electric aircraft and/or a cart 100. Battery cell 504 may include electrochemical cells, galvanic cells, electrolytic cells, fuel cells, flow cells, voltaic cells, or any combination thereof—to name a few. In embodiments, battery cells 504 may be electrically connected in series, in parallel, or a combination of series and parallel. Series connection, as used herein, comprises wiring a first terminal of a first cell to a second terminal of a second cell and further configured to comprise a single conductive path for electricity to flow while maintaining the same current (measured in Amperes) through any component in the circuit. Battery cells 504 may use the term 'wired', but one of ordinary skill in the art would appreciate that this term is synonymous with 'electrically connected', and that there are many ways to couple electrical elements like battery cells 504 together. As an example, battery cells 504 can be coupled via prefabricated terminals of a first gender that mate with a second terminal with a second gender. Parallel connection, as used herein, comprises wiring a first and second terminal of a first battery cell to a first and second terminal of a second battery cell and further configured to comprise more than one conductive path for electricity to flow while maintaining the same voltage (measured in Volts) across any component in the circuit. Battery cells 504 may be wired in a series-parallel circuit which combines characteristics of the constituent circuit types to this combination circuit. Battery cells 504 may be electrically connected in any arrangement which may confer onto the system the electrical advantages associated with that arrangement such as high-voltage applications, high-current applications, or the like.

As used herein, an electrochemical cell is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. As used herein, the term 'battery' is used as a collection of cells connected in series or parallel to each other.

According to embodiments and as discussed above, any two rows of battery cells 504 and therefore cell retainer 508 openings are shifted one half-length so that no two battery cells 504 are directly next to the next along the length of the battery module 500, this is the staggered arrangement presented in the illustrated embodiment of FIG. 5. Cell retainer 508 may employ this staggered arrangement to allow more cells to be disposed closer together than in square columns and rows like in a grid pattern. The staggered arrangement may also be configured to allow better thermodynamic dissipation, the methods of which may be further disclosed hereinbelow. Cell retainer 508 may comprise staggered openings that align with battery cells 504 and further configured to hold battery cells 504 in fixed positions. Cell retainer 508 may comprise an injection molded component. Injection molded component may comprise a component manufactured by injecting a liquid into a mold and letting it solidify, taking the shape of the mold in its hardened form. Cell retainer 508 may comprise liquid crystal polymer, polypropylene, polycarbonate, acrylonitrile butadiene styrene, polyethylene, nylon, polystyrene, polyether ether ketone, to name a few. Cell retainer 508 may comprise a second cell retainer fixed to the second end of battery cells 504 and configured to hold battery cells 504 in place from both ends. The second cell retainer may comprise similar or the exact same characteristics and functions of first cell retainer 508. Battery module 500 may also comprise cell guide 512. Cell guide 512 includes material disposed in between two rows of battery cells 504. In embodiments, cell guide 512 can be configured to distribute heat that may be generated by battery cells 504.

According to embodiments, battery module 500 may also comprise back plate 520. Back plate 520 is configured to provide a base structure for battery module 500 and may encapsulate at least a portion thereof. Backplate 520 can have any shape and includes opposite, opposing sides with a thickness between them. In embodiments, back plate 520 may comprise an effectively flat, rectangular prism shaped sheet. For example, back plate 520 can comprise one side of a larger rectangular prism which characterizes the shape of battery module 500 as a whole. Back plate 520 also comprises openings correlating to each battery cell 504 of the plurality of battery cells 504. Back plate 520 may comprise a lamination of multiple layers. The layers that are laminated together may comprise FR-4, a glass-reinforced epoxy laminate material, and a thermal barrier of a similar or exact same type as disclosed hereinabove. Back plate 520 may be configured to provide structural support and containment of at least a portion of battery module 500 as well as provide fire and thermal protection.

According to embodiments, battery module 500 may also comprise first end cap 524 configured to encapsulate at least a portion of battery module 500. End cap 524 may provide structural support for battery module 500 and hold back plate 520 in a fixed relative position compared to the overall battery module 500. End cap 524 may comprise a protruding boss on a first end that mates up with and snaps into a receiving feature on a first end of back plate 520. End cap 524 may comprise a second protruding boss on a second end that mates up with and snaps into a receiving feature on sense board.

Battery module 500 may also comprise at least a side panel 528 that may encapsulate two sides of battery module 500. Side panel 528 may comprise opposite and opposing faces comprising a metal or composite material. In the illustrative embodiment of FIG. 5, a second side panel 528 is present but not illustrated so that the inside of battery module 500 may be presented. Side panel(s) 528 may provide structural support for battery module 500 and provide a barrier to separate battery module 500 from exterior components within aircraft or environment.

Figure 6:
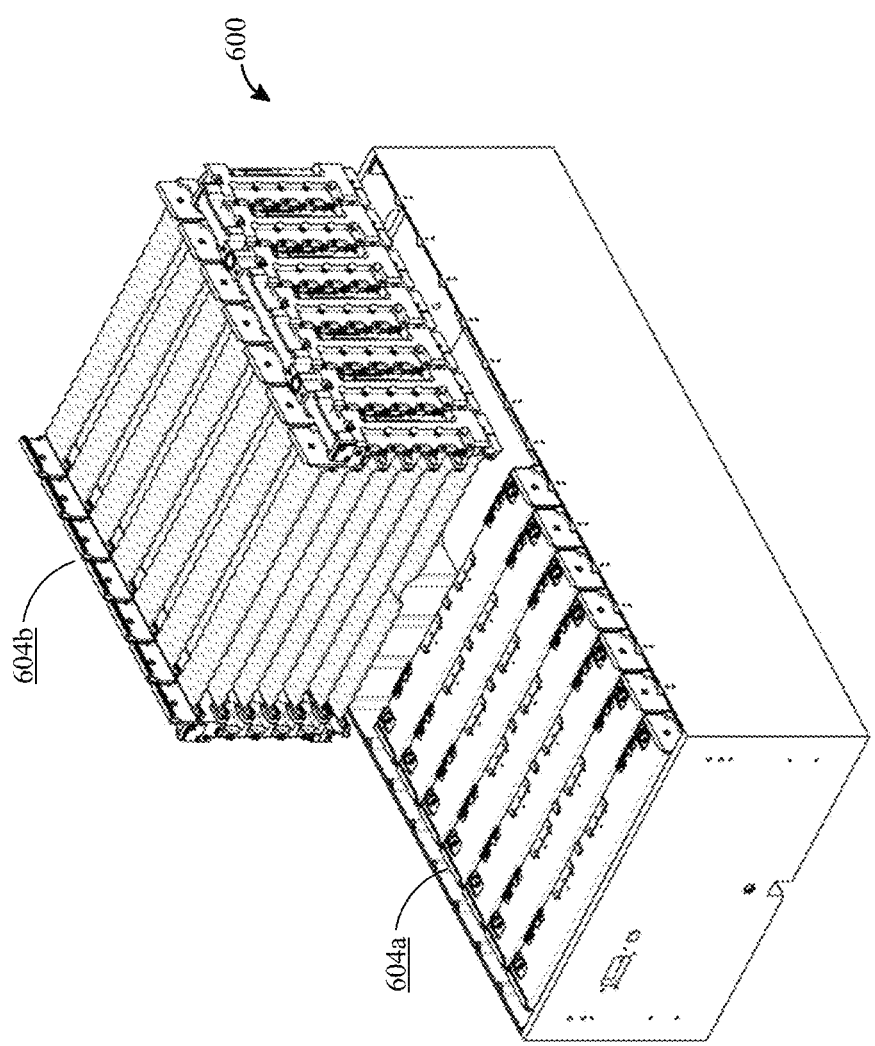
FIG. 6 is a schematic of an exemplary aircraft battery pack having a cooling circuit.

Referring now to FIG. 6, schematically illustrates an exemplary aircraft battery 600, in an isometric view. In some cases, vehicle battery 600 includes at least a cooling circuit 604. FIG. 6 illustrates vehicle battery 600 with one cooling circuit installed 604a and one cooling circuit uninstalled 604b. In some embodiments, battery 600 may include two or more cooling circuits 604a-b. Cooling circuits may be configured to allow coolant flow proximal battery module. In some cases, a thermal gradient between coolant and battery modules cools vehicle battery 600. Vehicle battery may be any type of battery described in this disclosure.

Figure 7:
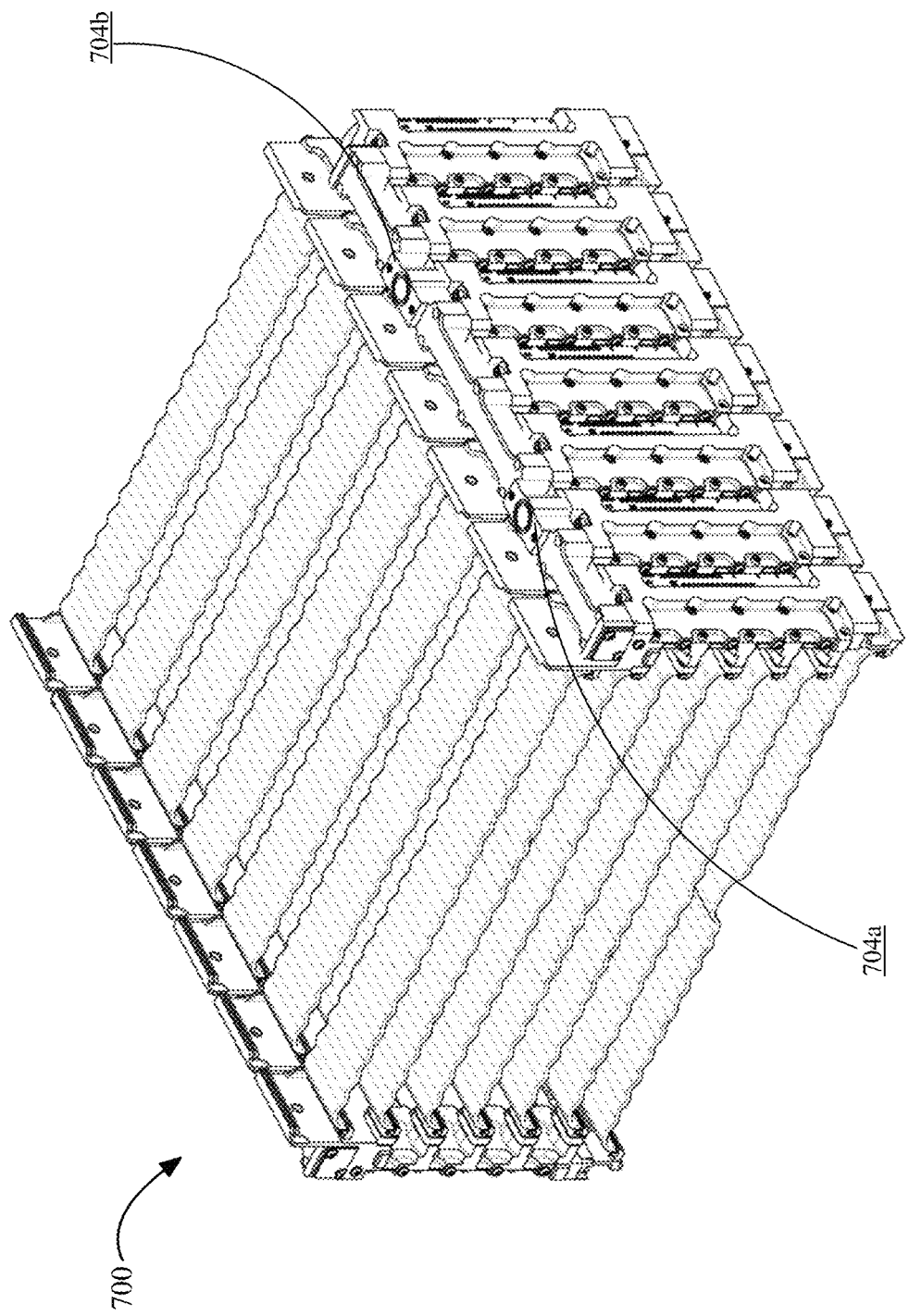
FIG. 7 schematically illustrates an exemplary cooling circuit.

Referring now to FIG. 7, schematically illustrates an exemplary cooling circuit 700, in an isometric view. In some cases, vehicle battery 600 may include a cooling circuit 700. Cooling circuit 700 may be configured to accept coolant flow, for example from connector and/or hose, and direct coolant proximal battery module and/or battery cells. In some cases, cooling circuit 700 may be configured to direct flow of coolant out of cooling circuit after it has passed through cooling circuit. In some cases, cooling circuit 700 may be configured to return coolant, for example to coolant source by way of one or more of connector and/or hose. Alternatively and/or additionally, cooling circuit 700 may direct or vent coolant out of cooling circuit substantially to atmosphere. In some embodiments, cooling circuit 700 may comprise one or more coolant fittings 704a-b. Coolant fittings 704a-b may be configured to accept a flow of coolant, for example from a coolant supply. Alternatively or additionally, coolant fittings 704a-b may be configured to return a flow of coolant, for example by way of a coolant return.

Figure 8:
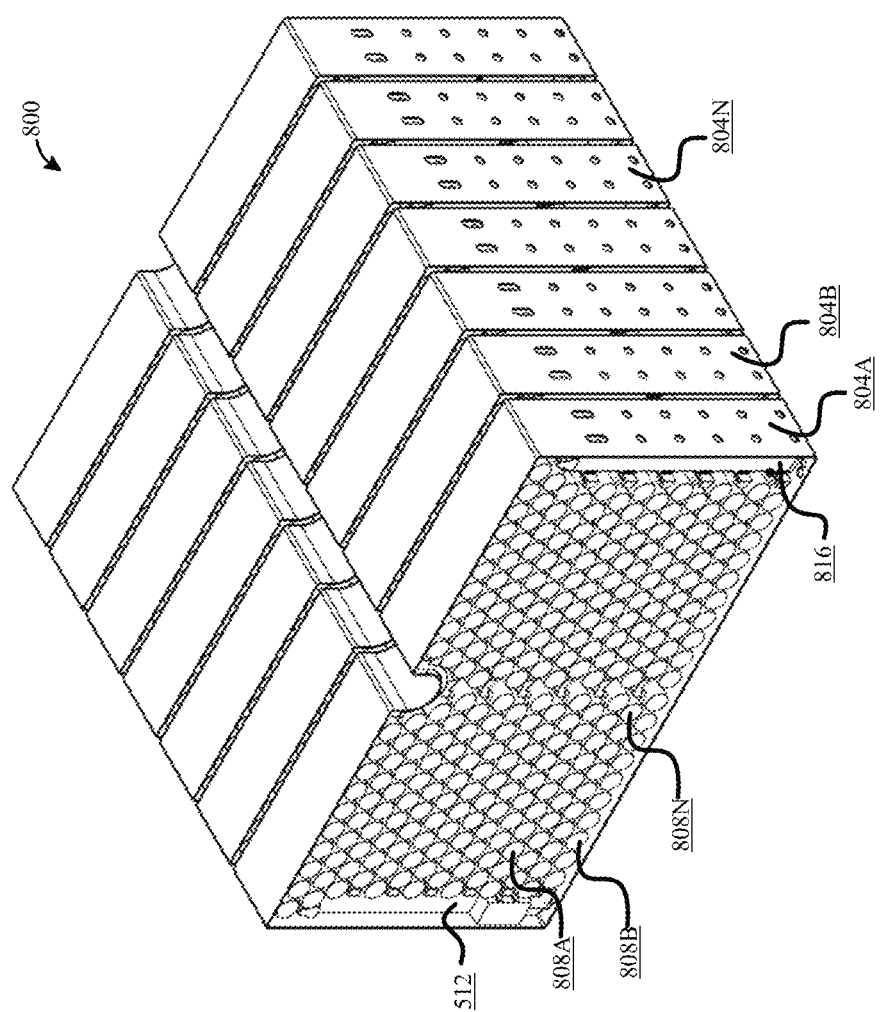
FIG. 8 is perspective drawings illustrating a battery pack, according to embodiments.

Referring now to FIG. 8, a perspective drawing of an embodiment of a battery pack with a plurality of battery modules disposed therein 800. The configuration of battery pack 800 is merely exemplary and should in no way be considered limiting. Battery pack 800 is configured to facilitate the flow of the media through each battery module of the plurality of battery modules to cool the battery pack. Battery pack 800 can include one or more battery modules 804A-N. Battery pack 800 is configured to house and/or encase one or more battery modules 804A-N. Each battery module of the plurality of battery modules 804A-N may include any battery module as described in further detail in the entirety of this disclosure. As an exemplary embodiment, FIG. 8 illustrates 7 battery modules 804A-N creating battery pack 800, however, a person of ordinary skill in the art would understand that any number of battery modules 804A-N may be housed within battery pack 800. In an embodiment, each battery module of the plurality of battery modules 804A-N can include one or more battery cells 808A-N. Each battery module 804A-N is configured to house and/or encase one or more battery cells 808A-N. Each battery cell of the plurality of battery cells 808A-N may include any battery cell as described in further detail in the entirety of this disclosure. Battery cells 808A-N may be configured to be contained within each battery module 804A-N, wherein each battery cell 808A-N is disposed in any configuration without limitation. As an exemplary embodiment, FIG. 8 illustrates 240 battery cells 808A-N housed within each battery module 804A-N, however, a person of ordinary skill in the art would understand that any number of battery units 808A-N may be housed within each battery module 804A-N of battery pack 800. Further, each battery module of the plurality of battery modules 804A-N of battery pack 800 includes circuit 812. Circuit 812 may include any circuit as described in further detail in the entirety of this disclosure. Each battery module of the plurality of battery modules 804A-N further includes second circuit 816. Second circuit 816 may include any circuit as described in further detail in the entirety of this disclosure. Persons skilled in the art, upon reviewing the entirety of this disclosure, will be aware of various configurations of the plurality of battery modules that may be utilized for the battery pack consistently with this disclosure.

According to some embodiments, a battery unit may be configured to couple to one or more other battery units, wherein the combination of two or more battery units forms at least a portion of vehicle battery and/or charging battery. Battery unit may be configured to include a plurality of battery cells. The plurality of battery cells may include any battery cell as described in the entirety of this disclosure. In the instant embodiment, for example and without limitation, battery unit includes a first row of battery cells, wherein first row of battery cells is in contact with the first side of the thermal conduit, as described in further detail below. As a non-limiting example, row of battery cells is configured to contain ten columns of battery cells. Further, in the instant embodiment, for example and without limitation, battery unit includes a second row of battery cells, wherein second row of battery cells is in contact with the second side of the thermal conduit, as described in further detail below. As a non-limiting example, second row of battery cells is configured to contain ten columns of battery cells. In some embodiments, battery unit may be configured to contain twenty battery cells in first row and second row. Battery cells of battery unit may be arranged in any configuration, such that battery unit may contain any number of rows of battery cells and any number of columns of battery cells. In embodiments, battery unit may contain any offset of distance between first row of battery cells and second row of battery cells, wherein the battery cells of first row and the battery cells of second row are not centered with each other. In the instant embodiment, for example and without limitation, battery unit includes first row and adjacent second row each containing ten battery cells, each battery cell of first row and each battery cell of second row are shifted a length measuring the radius of a battery cell, wherein the center of each battery cell of first row and each battery cell of second row are separated from the center of the battery cell in the adjacent column by a length equal to the radius of the battery cell. As a further example and without limitation, each battery cell of first row and each battery cell of second row are shifted a length measuring a quarter the diameter of each battery cell, wherein the center of each battery cell of first row and each battery cell of second row are separated from the center of a battery cell in the adjacent column by a length equal to a quarter of the diameter of the battery cell. First row of battery cells and second row of battery cells of the at least a battery unit may be configured to be fixed in a position by utilizing a cell retainer, as described in the entirety of this disclosure. Each battery cell may be connected utilizing any means of connection as described in the entirety of this disclosure. Persons skilled in the art, upon reviewing the entirety of this disclosure, will be aware of electrical connections that may be used as in some embodiments, battery unit can include thermal conduit, wherein thermal conduit has a first surface and a second opposite and opposing surface. Thermal conduit may include any thermal conduit as described above in further detail in reference to FIGS. 1-8. In some cases, height of thermal conduit may not exceed the height of battery cells, as described in the entirety of this disclosure. For example, and without limitation, thermal conduit may be at a height that is equal to the height of each battery cell of first row and second row. Thermal conduit may be composed of any suitable material, as described above in further detail in reference to FIGS. 1-8. Thermal conduit is configured to include an indent in the component for each battery cell coupled to the first surface and/or the second surface of thermal conduit. Persons skilled in the art, upon reviewing the entirety of this disclosure, will be aware of components that may be used as thermal conduits consistently with this disclosure.

Continuing with reference to some embodiments, thermal conduit may include at least a passage, wherein the at least a passage comprises an opening starting at the first end of thermal conduit and terminating at a second, opposing end of thermal conduit. The "passage", as described herein, is a horizontal channel with openings on each end of the thermal conduit. The at least a passage may be configured to have a hollow shape comprising one or more sides, at least two ends (e.g. a top and a bottom), and a length, wherein the hollow shape comprises a void having a shape the same as or different from the shape of the at least a passage and terminating at an opposite, opposing second end of the shape. For example, and without limitation, in some embodiments, the at least a passage comprises a rectangle shaped tubular shape. In embodiments, the tubular component runs effectively perpendicular to each battery cell. In embodiments, the at least a passage can be disposed such that it forms a void originating at a first side of the battery module and terminating at the second, opposite, and opposing side, of the battery module. According to embodiments, the at least a passage and/or thermal conduit may be composed utilizing any suitable material. For example, and without limitation, thermal conduit and/or the at least a passage may be composed of polypropylene, polycarbonate, acrylonitrile butadiene styrene, polyethylene, nylon, polystyrene, polyether ether ketone, and the like.

In some embodiments, the at least a passage may be disposed in the thermal conduit such that the at least a passage is configured to allow the travel of a media from a first end of thermal conduit to the second, opposite, and opposite end of thermal conduit. For example, at least a passage can be disposed to allow the passage of the media through the hollow opening/void of the at least a passage. The media may include any media as described in the entirety of this disclosure. The hollow opening of thermal conduit and/or the at least a passage may be configured to be of any size and/or diameter. For example and without limitation, the hollow opening of the at least a passage may be configured to have a diameter that is equal to or less than the radius of each battery cell. The at least a passage and/or thermal conduit may have a length equal or less than the length of one row of battery cells such that thermal conduit and/or the at least a passage is configured to not exceed the length of first row and/or second row of battery cells. The opening of the at least a passage can be configured to be disposed at each end of thermal conduit, wherein the at least a passage may be in contact with each battery cell in a respective battery unit located at the end of each column and/or row of the battery unit. For example and without limitation, in some embodiments, a battery unit can contain two rows with ten columns of battery cells and the opening of the at least a passage on each end of thermal conduit that is in contact with a respective battery cell at the end of each of the two columns. Persons skilled in the art, upon reviewing the entirety of this disclosure, will be aware of various components that may be used as at least a passage consistently with this disclosure.

In some embodiments, circuit and/or thermal conduit may be configured to facilitate the flow of the media through each battery module of the plurality of battery modules to cool the battery pack. The media may include any media as described in further detail in the entirety of this disclosure. Circuit can include any circuit as described above in further detail. In the embodiment, circuit may be configured to couple to a first end of thermal conduit, wherein coupling is configured to facilitate the flow of the media from the circuit to the first end of thermal conduit through the at least a passage. Coupling may include any coupling as described in further detail throughout the entirety of this disclosure. Circuit may include any component configured to facilitate the flow of media to the battery pack by utilizing an electrical current. For example and without limitation, circuit may include a printed circuit board, wherein the printed circuit board mechanically supports the electrical connection facilitating the flow of media to the battery pack. Circuit may be configured to include first end and a second end, wherein the second end is opposite the first end of circuit 1000. In some embodiments, first end of circuit is in a plane perpendicular to the longitudinal axis of thermal conduit. First end of circuit is configured to include media feed component. The embodiment of circuit illustrates media feed component disposed only on first side of circuit, however this is non-limiting and circuit may include media feed component disposed on the second end of circuit. The media feed component of circuit may be configured to allow the media to feed into circuit, the battery module and/or the battery pack, wherein the flow of media may be initiated as a function of coupling media feed component of circuit to the media feeder of the thermal management apparatus. Media feed component can include any media feed component as described in further detail above. In some embodiments, media feed component is a threaded hole, wherein the media feeder of the thermal management apparatus is configured to couple to the threaded hole of media feed component, however this is non-limiting and media feed component may include, without limitation, a magnetic component, a latching mechanism, a pressure fit tubing mechanism, a nozzle mechanism, a hole, a flap, and the like.

Continuing with reference to some embodiments, thermal conduit can include any thermal conduit as described in further detail above. The height of thermal conduit may not exceed the height of each battery cell of the plurality of battery cells, in some cases, as described in the entirety of this disclosure. Thermal conduit may be composed of any suitable material, as described above in further detail above. Thermal conduit may be configured to include any curvature of the first side and/or second side of thermal conduit. For example and without limitation the curvature of the first side and/or second side of thermal conduit correlates at least a portion of a battery cell of the plurality of battery cells. As a further example and without limitation, in an embodiment, thermal conduit may be configured to include ten curves of the first surface of thermal conduit, wherein each curve is configured to contain the at least a portion of each battery cell of the plurality of battery cells adjacent to the first surface of thermal conduit. As a further example and without limitation, in some embodiments, thermal conduit may be configured to include ten curves on the second surface of thermal conduit wherein each curve may be configured to contain the at least a portion of each battery cell of the plurality of battery cells adjacent to the second surface of thermal conduit. The embodiment of thermal conduit illustrates ten curves on each surface of thermal conduit, however this is non-limiting and thermal conduit may include any number of curves on each surface of thermal conduit, wherein each curve corresponds to the at least a portion of a battery cell of the plurality of battery cells.

In some embodiments, thermal conduit can include any thermal conduit as described in further detail above. As described in further detail above, thermal conduit may be composed of any suitable material. Further, thermal conduit may be configured to include any curvature of the first side and/or second side of the thermal conduit, as described in further detail above. Thermal conduit may be configured to at least a passage. The at least a passage can include any at least a passage as described in further detail above. The at least a passage is configured to have a hollow shape comprising one or more sides, at least two ends (e.g. a top and a bottom), and a length, wherein the hollow shape comprises a void having a shape the same as or different from the shape of the at least a passage and terminating at an opposite, opposing second end of the shape, as described above in further detail above. For example and without limitation, in the illustrative embodiment, the at least a passage comprise a rectangle shaped tubular shape. In embodiments, the tubular component runs effectively perpendicular to each battery cell and/or curvature of thermal conduit configured to house each battery cell. In embodiments, the at least a passage can be disposed such that it forms a void originating at a first side of the battery module and terminating at the second, opposite, and opposing side, of the battery module, as described in further detail in the entirety of this disclosure. According to embodiments, the at least a passage and/or thermal conduit may be composed utilizing any suitable material, as described in further detail above. In embodiments, the at least a passage may be disposed in the thermal conduit such that the at least a passage may be configured to allow the travel of a media from a first end of thermal conduit to the second, opposite, and opposite end of thermal conduit, as described in further detail in the entirety of this disclosure.

Figure 9:
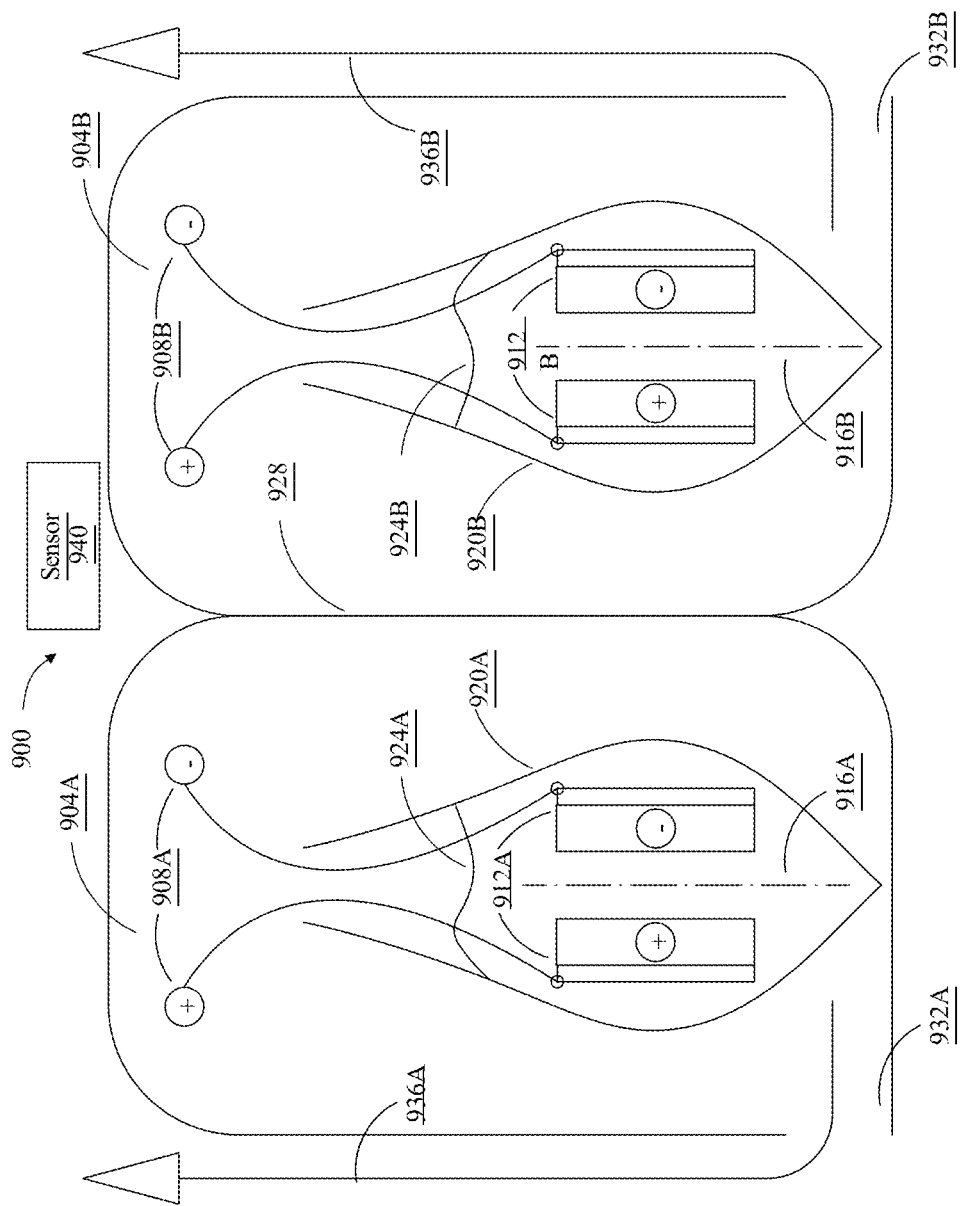
FIG. 9 is a block diagram of an exemplary battery pack for preventing progression of thermal runaway between modules.

Referring now to the drawings, FIG. 9 illustrates a block diagram of an exemplary battery pack 900 for preventing progression of thermal runaway between modules. Battery pack 900 may include a pouch cell 904A-B. As used in this disclosure, "pouch cell" is a battery cell or module that includes a pouch. In some cases, a pouch cell may include or be referred to as a prismatic pouch cell, for example when an overall shape of pouch is prismatic. In some cases, a pouch cell may include a pouch which is substantially flexible. Alternatively or additionally, in some cases, pouch may be substantially rigid. Pouch cell 904A-B may include at least a pair of electrodes 908A-B. At least a pair of electrodes 908A-B may include a positive electrode and a negative electrode. Each electrode of at least a pair of electrodes 908A-B may include an electrically conductive element. Non-limiting exemplary electrically conductive elements include braided wire, solid wire, metallic foil, circuitry, such as printed circuit boards, and the like. At least a pair of electrodes 908A-B may be in electric communication with and/or electrically connected to at least a pair of foil tabs 912A-B. At least a pair of electrodes 908A-B may be bonded in electric communication with and/or electrically connected to at least a pair of foil tabs 912A-B by any known method, including without limitation welding, brazing, soldering, adhering, engineering fits, electrical connectors, and the like. In some cases, at least a pair of foil tabs may include a cathode and an anode. In some cases, an exemplary cathode may include a lithium-based substance, such as lithium-metal oxide, bonded to an aluminum foil tab. In some cases, an exemplary anode may include a carbon-based substance, such as graphite, bonded to a copper tab. A pouch cell 904A-B may include an insulator layer 916A-B. As used in this disclosure, an "insulator layer" is an electrically insulating material that is substantially permeable to battery ions, such as without limitation lithium ions. In some cases, insulator layer may be referred to as a separator layer or simply separator. In some cases, insulator layer 916A-B is configured to prevent electrical communication directly between at least a pair of foil tabs 912A-B (e.g., cathode and anode). In some cases, insulator layer 916A-B may be configured to allow for a flow ions across it. Insulator layer 916A-B may consist of a polymer, such as without limitation polyolifine (PO). Insulator layer 916A-B may comprise pours which are configured to allow for passage of ions, for example lithium ions. In some cases, pours of a PO insulator layer 916A-B may have a width no greater than 100 μm, 10 μm, or 0.1 μm. In some cases, a PO insulator layer 916A-B may have a thickness within a range of 1-100 μm, or 10-50 μm.

With continued reference to FIG. 9, pouch cell 904A-B may include a pouch 920A-B. Pouch 920A-B may be configured to substantially encompass at least a pair of foil tabs 912A-B and at least a portion of insulator layer 916A-B. In some cases, pouch 920A-B may include a polymer, such as without limitation polyethylene, acrylic, polyester, and the like. In some case, pouch 920A-B may be coated with one or more coatings. For example, in some cases, pouch may have an outer surface coated with a metalizing coating, such as an aluminum or nickel containing coating. In some cases, pouch coating be configured to electrically ground and/or isolate pouch, increase pouches impermeability, increase pouches resistance to high temperatures, increases pouches thermal resistance (insulation), and the like. An electrolyte 924A-B is located within pouch. In some cases, electrolyte 924A-B may comprise a liquid, a solid, a gel, a paste, and/or a polymer. Electrolyte may wet or contact one or both of at least a pair of foil tabs 912A-B.

With continued reference to FIG. 9, battery pack 900 may additionally include an ejecta barrier 928. Ejecta barrier may be located substantially between a first pouch cell 904A and a second pouch cell 904B. As used in this disclosure, an "ejecta barrier" is any material or structure that is configured to substantially block, contain, or otherwise prevent passage of ejecta. As used in this disclosure, "ejecta" is any material that has been ejected, for example from a battery cell. In some cases, ejecta may be ejected during thermal runaway of a battery cell. Alternatively or additionally, in some cases, eject may be ejected without thermal runaway of a battery cell. In some cases, ejecta may include lithium-based compounds. Alternatively or additionally, ejecta may include carbon-based compounds, such as without limitation carbonate esters. Ejecta may include matter in any phase or form, including solid, liquid, gas, vapor, and the like. In some cases, ejecta may undergo a phase change, for example ejecta may be vaporous as it is initially being ejected and then cool and condense into a solid or liquid after ejection. In some cases, ejecta barrier may be configured to prevent materials ejected from a first pouch cell 904A from coming into contact with a second pouch cell 904B. For example, in some instances ejecta barrier 928 is substantially impermeable to ejecta from battery pouch cell 904A-B. In some embodiments, ejecta barrier 928 may include titanium. In some embodiments, ejecta barrier 928 may include carbon fiber. In some cases, ejecta barrier 928 may include at least a one of a lithiophilic or a lithiophobic material or layer, configured to absorb and/or repel lithium-based compounds. In some cases, ejecta barrier 928 may comprise a lithiophilic metal coating, such as silver or gold. In some cases, ejecta barrier 928 may be flexible and/or rigid. In some cases, ejecta barrier 928 may include a sheet, a film, a foil, or the like. For example in some cases, ejecta barrier may be between 25 and 5,000 micrometers thick. In some cases, an ejecta barrier may have a nominal thickness of about 2 mm. Alternatively or additionally, in some cases, an ejecta barrier may include rigid and/or structural elements, for instance which are solid. Rigid ejecta barriers 928 may include metals, composites and the like. In some cases, ejecta barrier 928 may be further configured to structurally support at least a pouch cell 928. For example in some cases, at least a pouch cell 928 may be mounted to a rigid ejecta barrier 928.

With continued reference to FIG. 9, battery pack 900 may additionally include at least a vent 932A-B. In some cases, at least a vent 932A may be configured to vent ejecta from first pouch cell 904A. In some cases, at least a vent 904A may be configured to vent ejecta along a flow path 936A. A flow path 936A may substantially exclude second pouch cell 904B, for example fluids such as gases liquids, or any material that acts as a gas or liquid, flowing along the flow path 936A may be cordoned away from contact with second pouch cell 904B. For example flow path 936A may be configured to not intersect with any surface of second pouch cell 904B. Flow path 936A-B may include any channel, tube, hose, conduit, or the like suitable for facilitating fluidic communication, for example with a pouch cell 904A-B. In some cases, flow path 936A-B may include a check valve. As used in this disclosure, a "check valve" is a valve that permits flow of a fluid only in certain, for example one, direction. In some cases check valve may be configured to allow flow of fluids substantially only away from battery pouch cell 904A-B, while preventing back flow of vented fluid to the battery pouch cell 904A-B. In some cases, check valve may include a duckbill check valve. In some cases, a duckbill check valve may have lips which are substantially in a shape of a duckbill. Lips may be configured to open to allow forward flow (out of the lips), while remaining normally closed to prevent backflow (into the lips). In some cases, duckbill lips may be configured to automatically close (remain normally closed), for example with use of a compliant element, such as without limitation an elastomeric material, a spring, and the like. In some embodiments vent may include a mushroom poppet valve. In some cases, a mushroom poppet valve may include a mushroom shaped poppet. Mushroom shaped poppet may seal against a sealing element, for example a ring about an underside of a cap of the mushroom shaped poppet. In some cases, mushroom poppet valve may be loaded against sealing element, for example by way of a compliant element, such as a spring. According to some embodiments, vent 932A-B may have a vacuum applied to aid in venting of ejecta. Vacuum pressure differential may range from 0.1 "Hg to 36 " Hg.

With continued reference to FIG. 9, battery pack 900 may include a first battery pouch cell 904A and a second battery pouch cell 904B. First pouch cell 904A may include at least a first pair of electrodes 908A, at least a first pair of foil tabs 912A in electrical communication with the first electrodes 908A, at least a first insulator layer 916A located substantially between the at least a first pair of foil tabs 912A, a first pouch 920A substantially encompassing the at least a first pair of foil tabs 912A and at least a portion of the at least a first separator layer 916A, and a first electrolyte 924A within the first pouch 920A. Second pouch cell 904B may include at least a second pair of electrodes 908B, at least a second pair of foil tabs 912B in electrical communication with the first electrodes 908B, at least a second insulator 916B located substantially between the at least a first pair of foil tabs 912B, a second pouch 920B substantially encompassing the at least a second pair of foil tabs 912B and at least a portion of the at least a second insulator 916B, and a second electrolyte 924B within the second pouch 920B. Battery pack 900 may include an ejecta barrier 928 located substantially between first pouch cell 904A and second pouch cell 904B. Ejecta barrier 928 may be substantially impermeable to ejecta, for example ejecta from first pouch cell 904A. In some cases, battery pack 900 may include a vent configured to vent ejecta, for example from first pouch cell 904A. In some embodiments, ejecta barrier 928 may substantially encapsulates at least a portion of pouch cell 904A-B. For example, ejecta barrier 928 may substantially encapsulate first pouch cell 904A. In some cases, vent may be configured to provide fluidic communication through at least one of ejecta barrier 928 and pouch 920A-B. In some cases, vent may include a seam. Seam may be a seam of pouch 920A-B. Alternatively or additionally; seam may be a seam of ejecta barrier 928.

With continued reference to FIG. 9, in some embodiments battery pack 900 may additionally include a third pouch cell. Third pouch cell may include at least a third pair of electrodes, at least a third pair of foil tabs welded to the third electrodes, at least a third insulator layer located substantially between the at least a third pair of foil tabs, a third pouch substantially encompassing the at least a third pair of foil tabs and the at least a third separator layer, and a third electrolyte within the third pouch. Battery pack may include a plurality including any number of pouch cells. In some cases, each pouch cell of plurality of pouch cells is separated from adjacent pouch cells with at least an ejecta barrier 928. Any pouch cell of plurality of pouch cells in battery pack may include any component described in this disclosure, for example without limitation vents, valves, and the like.

Still referring to FIG. 9, in some embodiments, pouch cells 904A-B may include Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon, tin nanocrystals, graphite, graphene or titanate anode, or the like. Batteries and/or battery modules may include without limitation batteries using nickel-based chemistries such as nickel cadmium or nickel metal hydride, batteries using lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), batteries using lithium polymer technology, metal-air batteries. Pouch cells 904A-B may include lead-based batteries such as without limitation lead acid batteries and lead carbon batteries. Pouch cells 904A-B may include lithium sulfur batteries, magnesium ion batteries, and/or sodium ion batteries. Batteries may include solid state batteries or supercapacitors or another suitable energy source. Batteries may be primary or secondary or a combination of both. Additional disclosure related to batteries and battery modules may be found in co-owned U.S. Patent Applications entitled "SYSTEM AND METHOD FOR HIGH ENERGY DENSITY BATTERY MODULE" and "SYSTEMS AND METHODS FOR RESTRICTING POWER TO A LOAD TO PREVENT ENGAGING CIRCUIT PROTECTION DEVICE FOR AN AIRCRAFT," having U.S. patent application Ser. Nos. 16/948,140 and 16/590,496 respectively; the entirety of both applications are incorporated herein by reference. Persons skilled in the art, upon reviewing the entirety of this disclosure, will be aware of various devices of components that may be used as a battery module. In some cases, battery pack 900 is constructed in a manner that vents ejecta, while preventing ejecta from one pouch cell from interacting with another pouch cell.

With continued reference to FIG. 9, battery pack 900 may include at least a sensor 940. At least a sensor 940 may include a sensor suite, for example as described above. In some cases, at least a sensor 940 may be configured to sense battery pack data and transmit battery pack data to a data storage system, for example as described above.

Figure 10:
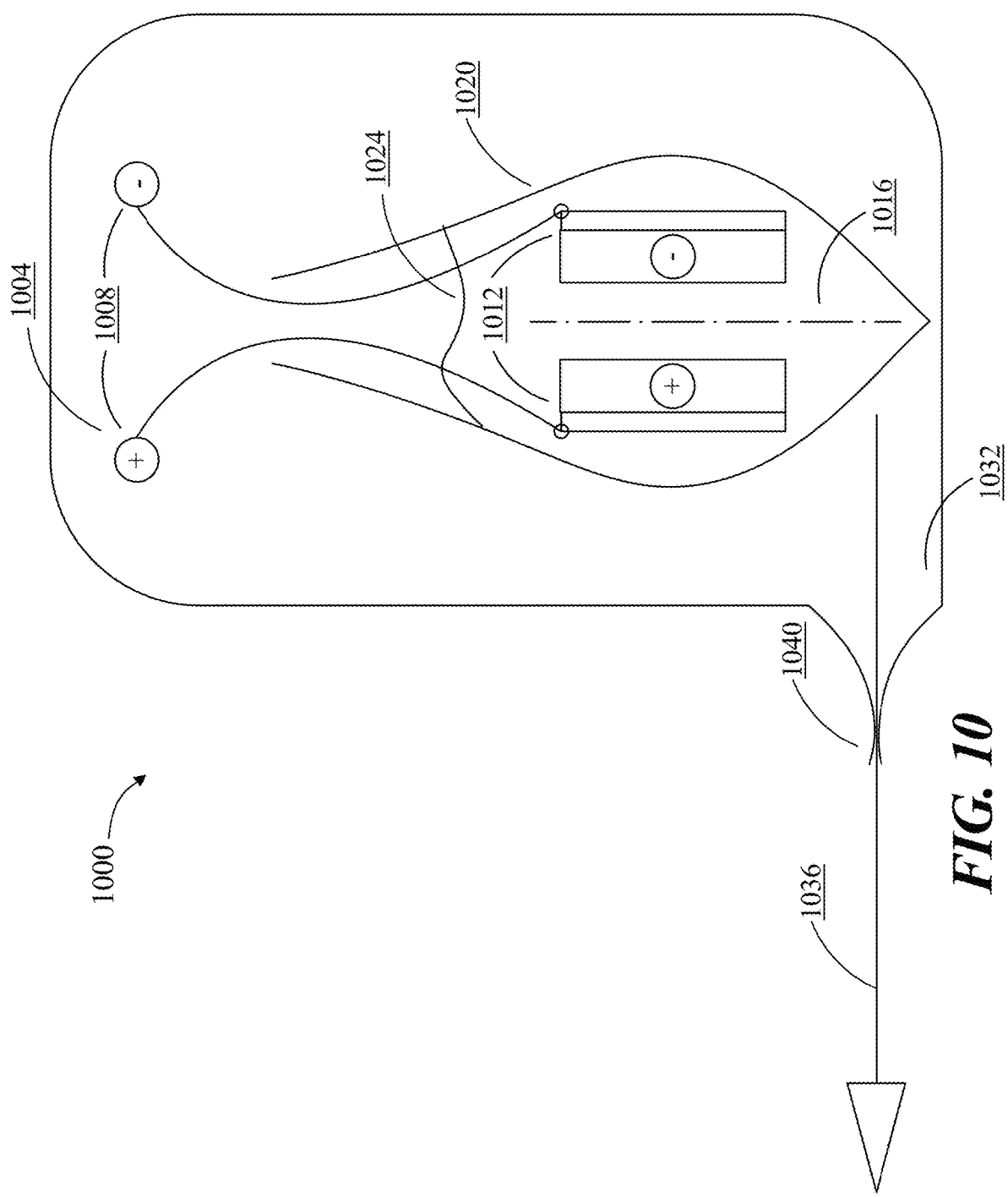
FIG. 10 is a block diagram of an exemplary battery pack for preventing progression of thermal runaway between modules.

Referring now to FIG. 10, at least a portion of an exemplary battery pack 1000 is illustrated. As shown in FIG. 10, battery pack 1000 may include a pouch cell 1004. Pouch cell 1004 may include at least a pair of electrodes 1008, at least a pair of foil tabs 1012 in electrical communication with the electrodes 1008, at least an insulator layer 1016 located substantially between the at least a pair of foil tabs 1012, a pouch 920 substantially encompassing the at least a pair of foil tabs 1012 and at least a portion of the at least a separator layer 1016, and a first electrolyte 1024 within the pouch 1020. Battery pack 1000 may include an ejecta barrier 1028. Ejecta barrier 1028 may configured to prevent ejecta from one pouch cell 1004 from reaching another pouch cell. In some cases, ejecta may include hot matter, which if left uncontained could transfer heat to other, e.g., neighboring, pouch cells. By preventing hot ejecta from reaching pouch cells ejecta barrier 1028 may aid in preventing progression of thermal runaway between battery cells within battery pack 1000. In some cases, ejecta may include combustible materials, which if left uncontained could settle upon other, e.g., neighboring, pouch cells. Combustible materials once combustion conditions are met may combust generating an exothermic reaction, which can induce thermal runaway on nearby battery cells. Combustion conditions can include presence of oxygen, fuel, spark, flash point, fire point, and/or autoignition temperature. Battery pack 1000 may include a vent 1032. Vent 1032 may provide for ejecta flow along a flow path 1036. Vent may include a check valve 1040. Check valve 1040 may be configured to allow for a flow of fluids in substantially one direction, for example away from pouch cell 1004. In some cases, vent 1032 may be configured to allow for a venting of ejecta from pouch cell 1004 without substantially any flow of ejecta toward the pouch cell 1004, for example from other battery cells. According to some embodiments, battery pack 1000 may be incorporated in an aircraft, for example a vertical take-off and landing aircraft.

Figure 11:
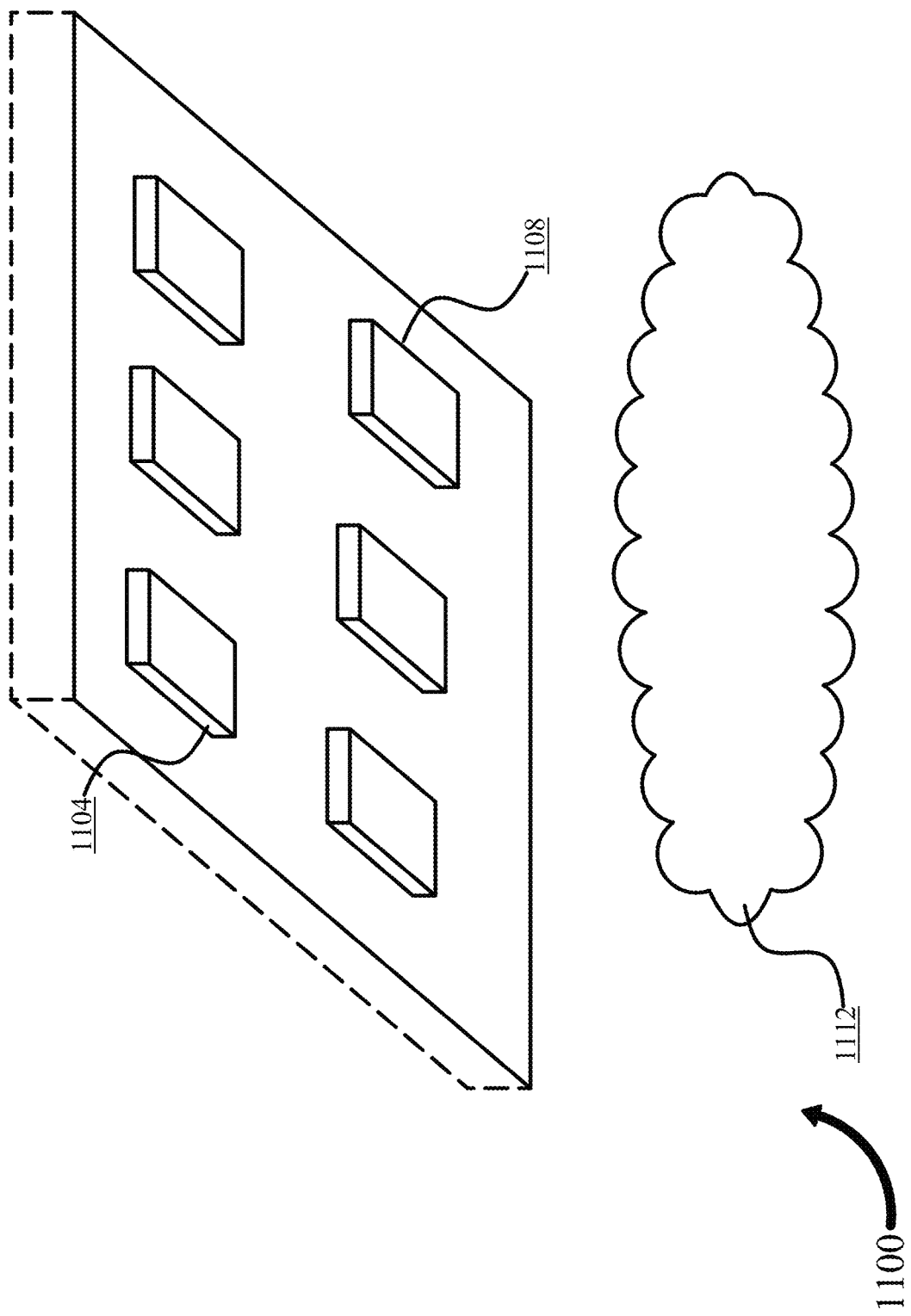
FIG. 11 is a block diagram illustrating an exemplary sensor suite.

Referring now to FIG. 11, an embodiment of sensor suite 1100 is presented. The herein disclosed system and method may comprise a plurality of sensors in the form of individual sensors or a sensor suite working in tandem or individually. In some cases, sensor suite 1100 may communicate by way of at least a conductor 120, such as within limitation a control signal conductor. Alternatively and/or additionally, in some cases, sensor suite 1100 may be communicative by at least a network, for example any network described in this disclosure including wireless (Wi-Fi), controller area network (CAN), the Internet, and the like. A sensor suite may include a plurality of independent sensors, as described herein, where any number of the described sensors may be used to detect any number of physical or electrical quantities associated with a vehicle battery or an electrical energy storage system, such as without limitation charging battery. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure.

In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of controller 104 and/or user to detect phenomenon is maintained.

With continued reference to FIG. 11, sensor suite 1100 may include a humidity sensor 1104. Humidity, as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. Humidity sensor 1104 may be psychrometer. Humidity sensor 1104 may be a hygrometer. Humidity sensor 1104 may be configured to act as or include a humidistat. A "humidistat", for the purposes of this disclosure, is a humidity-triggered switch, often used to control another electronic device. Humidity sensor 1104 may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 11, sensor suite 1100 may include multimeter 1108. Multimeter 1108 may be configured to measure voltage across a component, electrical current through a component, and resistance of a component. Multimeter 1108 may include separate sensors to measure each of the previously disclosed electrical characteristics such as voltmeter, ammeter, and ohmmeter, respectively. Alternatively or additionally, and with continued reference to FIG. 11, sensor suite 1100 may include a sensor or plurality thereof that may detect voltage and direct charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. Sensor suite 1100 and/or a control circuit incorporated therein and/or communicatively connected thereto may be configured to adjust charge to one or more battery cells as a function of a charge level and/or a detected parameter. For instance, and without limitation, sensor suite 1100 may be configured to determine that a charge level of a battery cell is high based on a detected voltage level of that battery cell or portion of the battery pack. Sensor suite 1100 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. Sensor suite 1100 may include digital sensors, analog sensors, or a combination thereof. Sensor suite 1100 may include digital-to-analog converters (DAC), analog-to-digital converters (ADC, A/D, A-to-D), a combination thereof, or other signal conditioning components used in transmission of a battery sensor signal to a destination over wireless or wired connection.

With continued reference to FIG. 11, sensor suite 1100 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor suite 1100, may be measured in Fahrenheit (° F.), Celsius (° C.), Kelvin (° K.), or another scale alone or in combination. The temperature measured by sensors may comprise electrical signals which are transmitted to their appropriate destination wireless or through a wired connection.

With continued reference to FIG. 11, sensor suite 1100 may include a sensor configured to detect gas that may be emitted during or after a catastrophic cell failure. "Catastrophic cell failure", for the purposes of this disclosure, refers to a malfunction of a battery cell, which may be an electrochemical cell, that renders the cell inoperable for its designed function, namely providing electrical energy to at least a portion of an electric aircraft. Byproducts of catastrophic cell failure 1112 may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 1100, may be configured to detect combustible, flammable, toxic, oxygen depleted, a combination thereof, or another type of gas alone or in combination. The gas sensor that may be present in sensor suite 1100 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 1100 may include sensors that are configured to detect non-gaseous byproducts of catastrophic cell failure 1112 including, in non-limiting examples, liquid chemical leaks including aqueous alkaline solution, ionomer, molten phosphoric acid, liquid electrolytes with redox shuttle and ionomer, and salt water, among others. Sensor suite 1100 may include sensors that are configured to detect non-gaseous byproducts of catastrophic cell failure 1112 including, in non-limiting examples, electrical anomalies as detected by any of the previous disclosed sensors or components.

With continued reference to FIG. 11, sensor suite 1100 may be configured to detect events where voltage nears an upper voltage threshold or lower voltage threshold. The upper voltage threshold may be stored in data storage system for comparison with an instant measurement taken by any combination of sensors present within sensor suite 1100. The upper voltage threshold may be calculated and calibrated based on factors relating to battery cell health, maintenance history, location within battery pack, designed application, and type, among others. Sensor suite 1100 may measure voltage at an instant, over a period of time, or periodically. Sensor suite 1100 may be configured to operate at any of these detection modes, switch between modes, or simultaneous measure in more than one mode. Controller 104 may detect through sensor suite 1100 events where voltage nears the lower voltage threshold. The lower voltage threshold may indicate power loss to or from an individual battery cell or portion of the battery pack. Controller 104 may detect through sensor suite 1100 events where voltage exceeds the upper and lower voltage threshold. Events where voltage exceeds the upper and lower voltage threshold may indicate battery cell failure or electrical anomalies that could lead to potentially dangerous situations for aircraft and personnel that may be present in or near its operation.

With continued reference to FIG. 11, in some cases, sensor suite 1100 may include a swell sensor configured to sense swell, pressure, or strain of at least a battery cell. In some cases, battery cell swell, pressure, and/or strain may be indicative of an amount of gases and/or gas expansion within a battery cell. Battery swell sensor may include one or more of a pressure sensor, a load cell, and a strain gauge. In some cases, battery swell sensor may output a battery swell signal that is analog and requires signal processing techniques. For example, in some cases, wherein battery swell sensor includes at least a strain gauge, battery swell signal may be processed and digitized by one or more of a Wheatstone bridge, an amplifier, a filter, and an analog to digital converter. In some cases, battery sensor signal may include battery swell signal.

Figure 12:
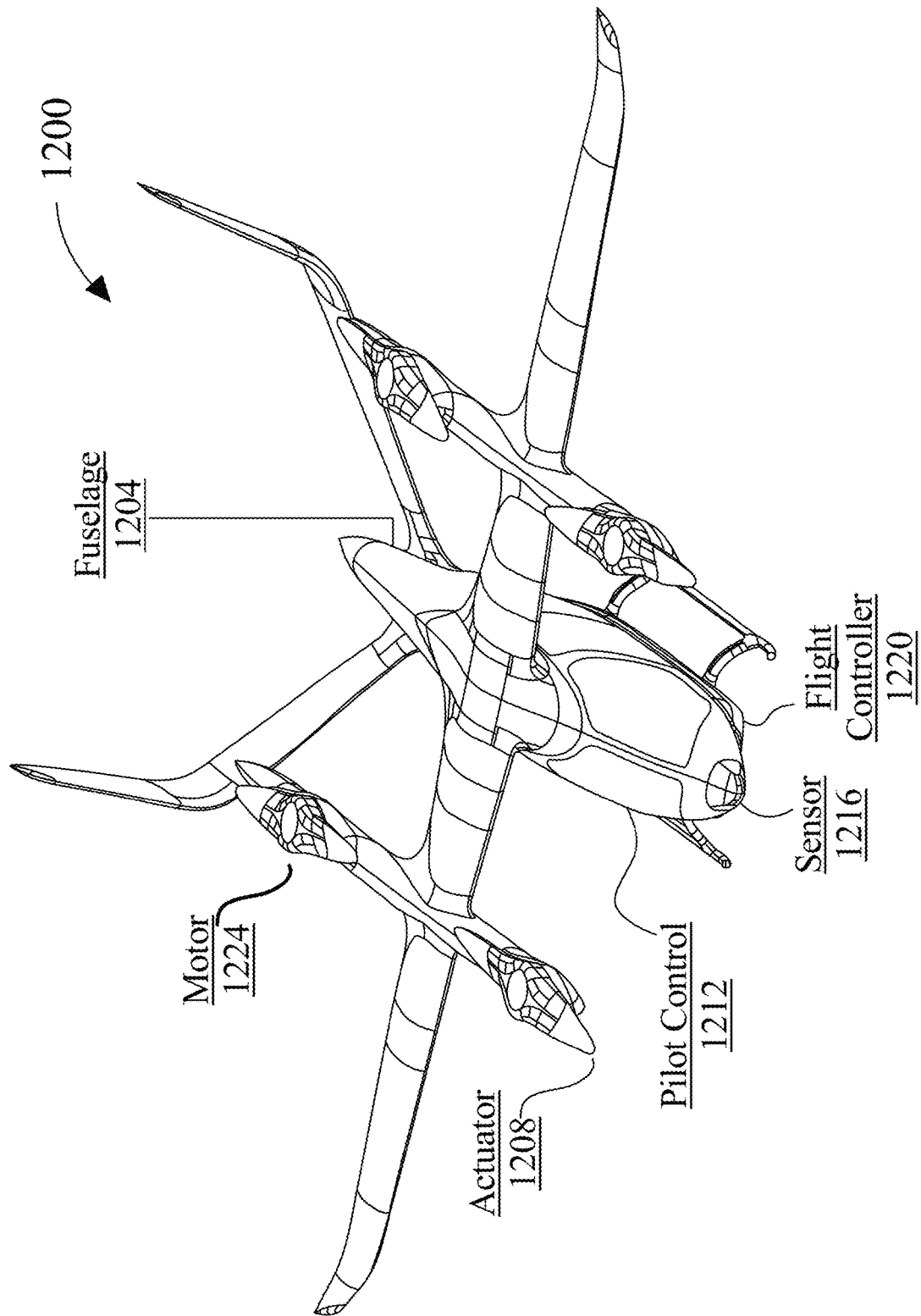
FIG. 12 is a schematic of an exemplary electric aircraft.

Referring now to FIG. 12, an exemplary embodiment of an aircraft 1200 is illustrated. Aircraft 1200 may include an electrically powered aircraft (i.e., electric aircraft). In some embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

Still referring to FIG. 12, aircraft 1200 may include a fuselage 1204. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 1204 may comprise structural elements that physically support the shape and structure of an aircraft. Structural elements may take a plurality of forms, alone or in combination with other types. Structural elements may vary depending on the construction type of aircraft and specifically, the fuselage. Fuselage 1204 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

Still referring to FIG. 12, aircraft 1200 may include a plurality of actuators 1208. Actuator 1208 may include any motor and/or propulsor described in this disclosure, for instance in reference to FIGS. 1-12. In an embodiment, actuator 1208 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. As used in this disclosure an "aircraft" is vehicle that may fly. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 12, a plurality of actuators 1208 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of actuators 1208 may include a component used to produce a torque that affects aircrafts' roll and pitch, such as without limitation one or more ailerons. An "aileron," as used in this disclosure, is a hinged surface which form part of the trailing edge of a wing in a fixed wing aircraft, and which may be moved via mechanical means such as without limitation servomotors, mechanical linkages, or the like. As a further example, plurality of actuators 1208 may include a rudder, which may include, without limitation, a segmented rudder that produces a torque about a vertical axis. Additionally or alternatively, plurality of actuators 1208 may include other flight control surfaces such as propulsors, rotating flight controls, or any other structural features which can adjust movement of aircraft 1200. Plurality of actuators 1208 may include one or more rotors, turbines, ducted fans, paddle wheels, and/or other components configured to propel a vehicle through a fluid medium including, but not limited to air.

Still referring to FIG. 12, plurality of actuators 1208 may include at least a propulsor component. As used in this disclosure a "propulsor component" or "propulsor" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

In another embodiment, and still referring to FIG. 12, propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

Still referring to FIG. 12, propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 12, plurality of actuators 1208 may include power sources, control links to one or more elements, fuses, and/or mechanical couplings used to drive and/or control any other flight component. Plurality of actuators 1208 may include a motor that operates to move one or more flight control components and/or one or more control surfaces, to drive one or more propulsors, or the like. A motor may be driven by direct current (DC) electric power and may include, without limitation, brushless DC electric motors, switched reluctance motors, induction motors, or any combination thereof. Alternatively or additionally, a motor may be driven by an inverter. A motor may also include electronic speed controllers, inverters, or other components for regulating motor speed, rotation direction, and/or dynamic braking.

Still referring to FIG. 12, plurality of actuators 1208 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system may be incorporated.

In an embodiment, and still referring to FIG. 12, an energy source may be used to provide a steady supply of electrical power to a load over a flight by an electric aircraft 1200. For example, energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, energy source may include an emergency power unit which may be capable of providing sufficient electrical power for auxiliary loads including without limitation, lighting, navigation, communications, de-icing, steering or other systems requiring power or energy. Further, energy source may be capable of providing sufficient power for controlled descent and landing protocols, including, without limitation, hovering descent or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 12, an energy source may include a plurality of energy sources, referred to herein as a module of energy sources. Module may include batteries connected in parallel or in series or a plurality of modules connected either in series or in parallel designed to satisfy both power and energy requirements. Connecting batteries in series may increase a potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on a measurement of at least an electrical parameter. In an embodiment where energy source includes a plurality of battery cells, overall power output capacity may be dependent on electrical parameters of each individual cell. If one cell experiences high self-discharge during demand, power drawn from at least an energy source may be decreased to avoid damage to a weakest cell. Energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/948,157 and 16/048,140 both entitled "SYSTEM AND METHOD FOR HIGH ENERGY DENSITY BATTERY MODULE" by S. Donovan et al., which are incorporated in their entirety herein by reference.

Still referring to FIG. 12, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

Still referring to FIG. 12, another exemplary actuator may include landing gear. Landing gear may be used for take-off and/or landing/Landing gear may be used to contact ground while aircraft 1200 is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

Still referring to FIG. 12, aircraft 1200 may include a pilot control 1212, including without limitation, a hover control, a thrust control, an inceptor stick, a cyclic, and/or a collective control. As used in this disclosure a "collective control" or "collective" is a mechanical control of an aircraft that allows a pilot to adjust and/or control the pitch angle of the plurality of actuators 1208. For example and without limitation, collective control may alter and/or adjust the pitch angle of all of the main rotor blades collectively. For example, and without limitation pilot control 1212 may include a yoke control. As used in this disclosure a "yoke control" is a mechanical control of an aircraft to control the pitch and/or roll. For example and without limitation, yoke control may alter and/or adjust the roll angle of aircraft 1200 as a function of controlling and/or maneuvering ailerons. In an embodiment, pilot control 1212 may include one or more footbrakes, control sticks, pedals, throttle levels, and the like thereof. In another embodiment, and without limitation, pilot control 1212 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft 1200 to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft 1200 upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

Still referring to FIG. 12, pilot control 1212 may be configured to modify a variable pitch angle. For example, and without limitation, pilot control 1212 may adjust one or more angles of attack of a propeller. As used in this disclosure an "angle of attack" is an angle between the chord of the propeller and the relative wind. For example, and without limitation angle of attack may include a propeller blade angled 3.2°. In an embodiment, pilot control 1212 may modify the variable pitch angle from a first angle of 2.71° to a second angle of 3.82°. Additionally or alternatively, pilot control 1212 may be configured to translate a pilot desired torque for flight component 1208. For example, and without limitation, pilot control 1212 may translate that a pilot's desired torque for a propeller be 160 lb. ft. of torque. As a further non-limiting example, pilot control 1212 may introduce a pilot's desired torque for a propulsor to be 290 lb. ft. of torque. Additional disclosure related to pilot control 1212 may be found in U.S. patent application Ser. Nos. 17/001, 845 and 16/929,206 both of which are entitled "A HOVER AND THRUST CONTROL ASSEMBLY FOR DUAL-MODE AIRCRAFT" by C. Spiegel et al., which are incorporated in their entirety herein by reference.

Still referring to FIG. 12, aircraft 1200 may include a loading system. A loading system may include a system configured to load an aircraft of either cargo or personnel.

For instance, some exemplary loading systems may include a swing nose, which is configured to swing the nose of aircraft 1200 of the way thereby allowing direct access to a cargo bay located behind the nose. A notable exemplary swing nose aircraft is Boeing 747. Additional disclosure related to loading systems can be found in U.S. patent application Ser. No. 17/137,594 entitled "SYSTEM AND METHOD FOR LOADING AND SECURING PAYLOAD IN AN AIRCRAFT" by R. Griffin et al., entirety of which in incorporated herein by reference.

Still referring to FIG. 12, aircraft 1200 may include a sensor 1216. Sensor 1216 may include any sensor or noise monitoring circuit described in this disclosure, for instance in reference to FIGS. 1-12. Sensor 1216 may be configured to sense a characteristic of pilot control 1212. Sensor may be a device, module, and/or subsystem, utilizing any hardware, software, and/or any combination thereof to sense a characteristic and/or changes thereof, in an instant environment, for instance without limitation a pilot control 1212, which the sensor is proximal to or otherwise in a sensed communication with, and transmit information associated with the characteristic, for instance without limitation digitized data. Sensor 1216 may be mechanically and/or communicatively coupled to aircraft 1200, including, for instance, to at least a pilot control 1212. Sensor 1216 may be configured to sense a characteristic associated with at least a pilot control 1212. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 1216 may include at least a geospatial sensor. Sensor 1216 may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft 1200 for both critical and non-critical functions. Sensor may be incorporated into vehicle or aircraft or be remote.

Still referring to FIG. 12, in some embodiments, sensor 1216 may be configured to sense a characteristic associated with any pilot control described in this disclosure. Non-limiting examples of a sensor 1216 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 1216 may sense a characteristic as an analog measurement, for instance, yielding a continuously variable electrical potential indicative of the sensed characteristic. In these cases, sensor 1216 may additionally comprise an analog to digital converter (ADC) as well as any additionally circuitry, such as without limitation a Whetstone bridge, an amplifier, a filter, and the like. For instance, in some cases, sensor 1216 may comprise a strain gage configured to determine loading of one or flight components, for instance landing gear. Strain gage may be included within a circuit comprising a Whetstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 1200, for instance without limitation a computing system, a pilot display, and a memory component.

Alternatively or additionally, sensor 1216 may sense a characteristic of a pilot control 1212 digitally. For instance in some embodiments, sensor 1216 may sense a characteristic through a digital means or digitize a sensed signal natively. In some cases, for example, sensor 1216 may include a rotational encoder and be configured to sense a rotational position of a pilot control; in this case, the rotational encoder digitally may sense rotational "clicks" by any known method, such as without limitation magnetically, optically, and the like.

Still referring to FIG. 12, electric aircraft 1200 may include at least a motor 1224, which may be mounted on a structural feature of the aircraft. Design of motor 1224 may enable it to be installed external to structural member (such as a boom, nacelle, or fuselage) for easy maintenance access and to minimize accessibility requirements for the structure.; this may improve structural efficiency by requiring fewer large holes in the mounting area. In some embodiments, motor 1224 may include two main holes in top and bottom of mounting area to access bearing cartridge. Further, a structural feature may include a component of electric aircraft 1200. For example, and without limitation structural feature may be any portion of a vehicle incorporating motor 1324, including any vehicle as described in this disclosure. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque, or shear stresses imposed by at least propulsor 1208. Persons skilled in the art, upon reviewing the entirety of this disclosure, will be aware of various materials, combinations of materials, and/or constructions techniques.

Still referring to FIG. 12, electric aircraft 1200 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 12, a number of aerodynamic forces may act upon the electric aircraft 1200 during flight. Forces acting on electric aircraft 1200 during flight may include, without limitation, thrust, the forward force produced by the rotating element of the electric aircraft 1200 and acts parallel to the longitudinal axis. Another force acting upon electric aircraft 1200 may be, without limitation, drag, which may be defined as a rearward retarding force which is caused by disruption of airflow by any protruding surface of the electric aircraft 1200 such as, without limitation, the wing, rotor, and fuselage. Drag may oppose thrust and acts rearward parallel to the relative wind. A further force acting upon electric aircraft 1200 may include, without limitation, weight, which may include a combined load of the electric aircraft 1200 itself, crew, baggage, and/or fuel. Weight may pull electric aircraft 1200 downward due to the force of gravity. An additional force acting on electric aircraft 1200 may include, without limitation, lift, which may act to oppose the downward force of weight and may be produced by the dynamic effect of air acting on the airfoil and/or downward thrust from the propulsor 1208 of the electric aircraft. Lift generated by the airfoil may depend on speed of airflow, density of air, total area of an airfoil and/or segment thereof, and/or an angle of attack between air and the airfoil. For example, and without limitation, electric aircraft 1200 are designed to be as lightweight as possible. Reducing the weight of the aircraft and designing to reduce the number of components is essential to optimize the weight. To save energy, it may be useful to reduce weight of components of electric aircraft 1200, including without limitation propulsors and/or propulsion assemblies. In an embodiment, motor 1224 may eliminate need for many external structural features that otherwise might be needed to join one component to another component. Motor 1224 may also increase energy efficiency by enabling a lower physical propulsor profile, reducing drag and/or wind resistance. This may also increase durability by lessening the extent to which drag and/or wind resistance add to forces acting on electric aircraft 1200 and/or propulsors.

Figure 13:
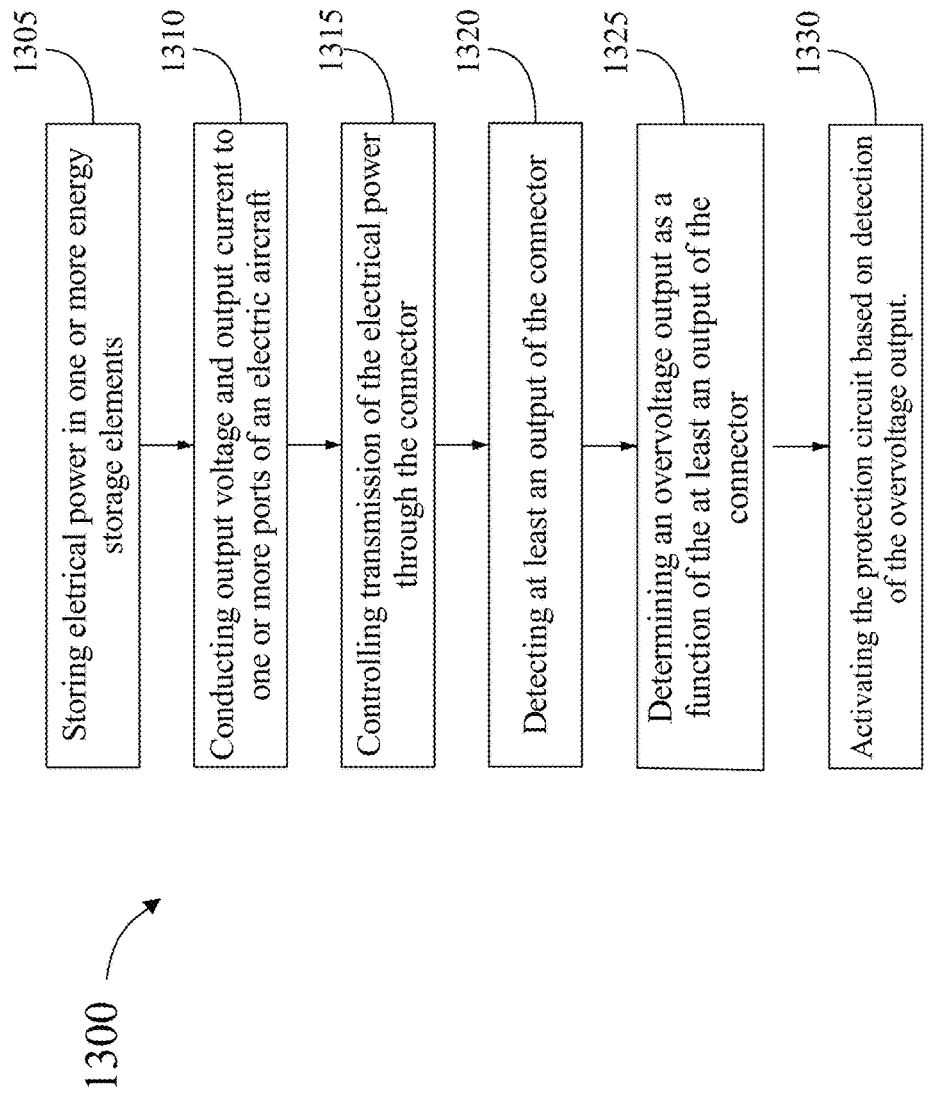
FIG. 13 is a flow diagram illustrating an exemplary method of use for an overvoltage protection system for an electric aircraft.

Referring now to FIG. 13, an exemplary method 1300 of us for a system for overvoltage protection in an electric aircraft. An electric vehicle may include any electric vehicle described in this disclosure, for example with reference to FIGS. 1-12. Connector may include any connector described in this disclosure, for example with reference to FIGS. 1-12. At step 1305, method 1300 may include storing, electrical power in one or more energy storage elements. An energy storage element may include any energy storage element described in this disclosure, for example with reference to FIGS. 1-12.

With continued reference to FIG. 13, at step 1310, method 1300 may include conducting, by a conductor of a connector, output voltage and output current to one or more ports of an electric aircraft. This conduction may include the use of direct current and/or the use of alternating current. The use of at least a direct current conductor, a direct current. Direct current conductor may include any conductor described in this disclosure, for example with reference to FIGS. 1-12. Direct current may include any direct current described in this disclosure, for example with reference to FIGS. 1-12. In some embodiments, conducting direct current may additionally include conducting, using at least a direct current conductor, one or more of at least 10 Kilowatts of power and at least 10 Amps of current. Alternating current conductor may include any conductor described in this disclosure, for example with reference to FIGS. 1-12. Alternating current may include any alternating current described in this disclosure, for example with reference to FIGS. 1-12. In some embodiments, conducting alternating current conducting, using at least an alternating current conductor, one or more of at least 10 Kilowatts of power and at least 10 Amps of current.

With continued reference to FIG. 13, at step 1315, method 1300 may include controlling, by an overvoltage protection device, transmission of the electrical power through the connector. Overvoltage protection device may include any method/device described in this disclosure, for example with reference to FIGS. 1-12. Overvoltage protection device may include any device described in this disclosure, for example with reference to FIGS. 1-12.

With continued reference to FIG. 13, at step 1320, method 1300 may include detecting, by one or more sensors, at least an output of the connector. A sensor may include any sensor described in this disclosure, for example with reference to FIGS. 1-12. A sensor may include any signal described in this disclosure, for example with reference to FIGS. 1-12.

With continued reference to FIG. 13, at step 1325, method 1300 may include determining, by a controller, an overvoltage output as a function of the at least an output of the connector. Overvoltage protection device conductor may include any conductor described in this disclosure, for example with reference to FIGS. 1-12. Overvoltage protection device may include any signal described in this disclosure, for example with reference to FIGS. 1-12.

With continued reference to FIG. 13, at step 1330, method 1300 may include activating, by the controller, the protection circuit based on detection of the overvoltage output. Overvoltage protection device conductor may include any conductor described in this disclosure, for example with reference to FIGS. 1-12. Protection circuit may include any circuit described in this disclosure, for example with reference to FIGS. 1-12

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 14:
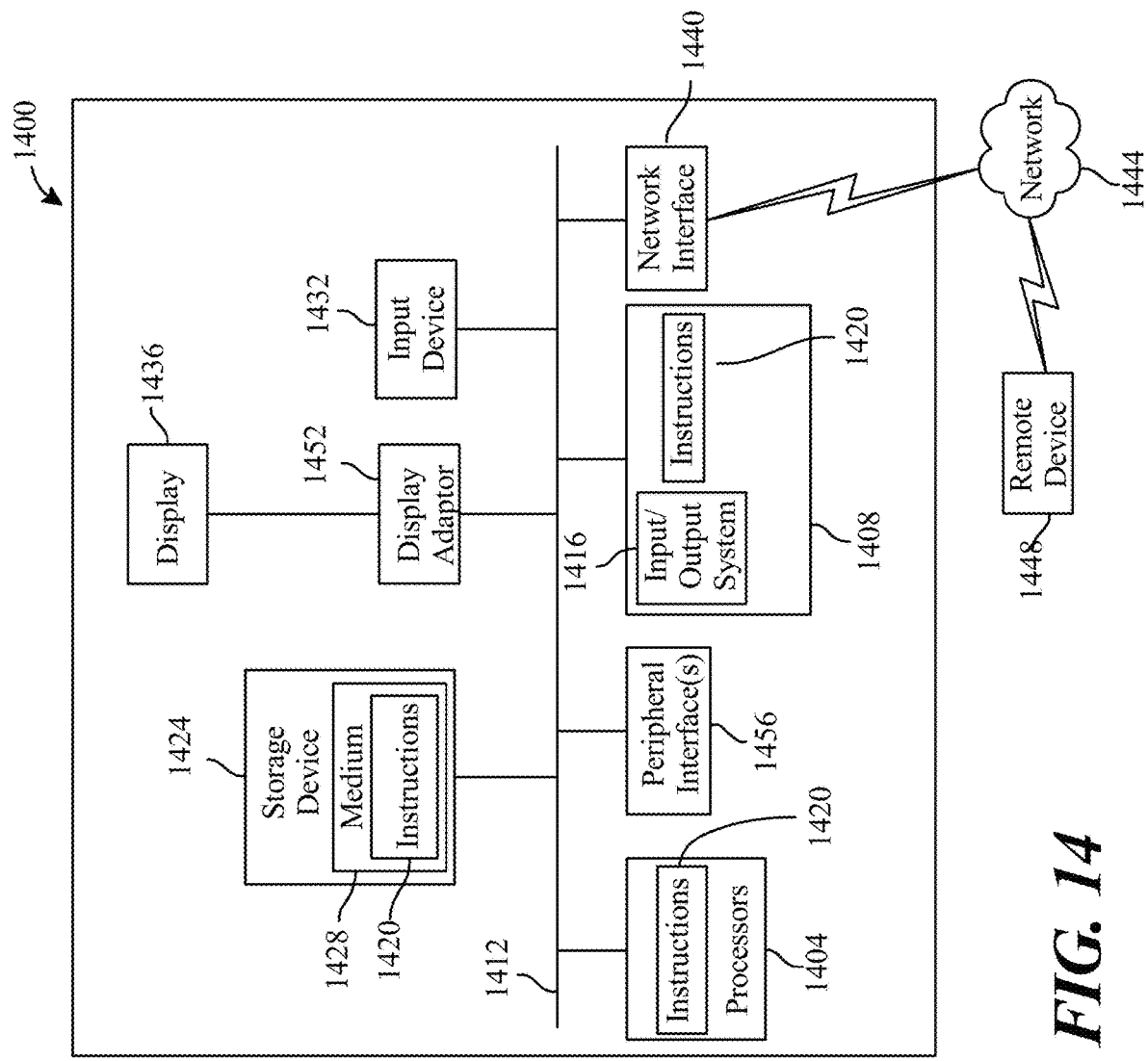
FIG. 14 is a block diagram of a computing system that can be used to implement any one or more of the methodologies disclosed herein and any one or more portions thereof.

FIG. 14 shows a diagrammatic representation of one embodiment of a computing device in the exemplary form of a computer system 1400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1400 includes a processor 1404 and a memory 1408 that communicate with each other, and with other components, via a bus 1412. Bus 1412 may include any of several types of bus structures including, but not limited to, a memory bus, a memory controller, a peripheral bus, a local bus, and any combinations thereof, using any of a variety of bus architectures.

Processor 1404 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1404 may be organized according to Von Neumann and/or Harvard architecture as a non-limiting example. Processor 1404 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1408 may include various components (e.g., machine-readable media) including, but not limited to, a random-access memory component, a read only component, and any combinations thereof. In one example, a basic input/output system 1416 (BIOS), including basic routines that help to transfer information between elements within computer system 1400, such as during start-up, may be stored in memory 1408. Memory 1408 may also include (e.g., stored on one or more machine-readable media) instructions (e.g., software) 1420 embodying any one or more of the aspects and/or methodologies of the present disclosure. In another example, memory 1408 may further include any number of program modules including, but not limited to, an operating system, one or more application programs, other program modules, program data, and any combinations thereof.

Computer system 1400 may also include a storage device 1424. Examples of a storage device (e.g., storage device 1424) include, but are not limited to, a hard disk drive, a magnetic disk drive, an optical disc drive in combination with an optical medium, a solid-state memory device, and any combinations thereof. Storage device 1424 may be connected to bus 1412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1424 (or one or more components thereof) may be removably interfaced with computer system 1400 (e.g., via an external port connector (not shown)). Particularly, storage device 1424 and an associated machine-readable medium 1428 may provide nonvolatile and/or volatile storage of machine-readable instructions, data structures, program modules, and/or other data for computer system 1400. In one example, software 1420 may reside, completely or partially, within machine-readable medium 1428. In another example, software 1420 may reside, completely or partially, within processor 1404.

Computer system 1400 may also include an input device 1432. In one example, a user of computer system 1400 may enter commands and/or other information into computer system 1400 via input device 1432. Examples of an input device 1432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1432 may be interfaced to bus 1412 via any of a variety of interfaces (not shown) including, but not limited to, a serial interface, a parallel interface, a game port, a USB interface, a FIREWIRE interface, a direct interface to bus 1412, and any combinations thereof. Input device 1432 may include a touch screen interface that may be a part of or separate from display 1436, discussed further below. Input device 1432 may be utilized as a user selection device for selecting one or more graphical representations in a graphical interface as described above.

A user may also input commands and/or other information to computer system 1400 via storage device 1424 (e.g., a removable disk drive, a flash drive, etc.) and/or network interface device 1440. A network interface device, such as network interface device 1440, may be utilized for connecting computer system 1400 to one or more of a variety of networks, such as network 1444, and one or more remote devices 1448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1444, may employ a wired and/or a wireless mode of communication. In general, any network topology may be used. Information (e.g., data, software 1420, etc.) may be communicated to and/or from computer system 1400 via network interface device 1440.

Computer system 1400 may further include a video display adapter 1452 for communicating a displayable image to a display device, such as display device 1436. Examples of a display device include, but are not limited to, a liquid crystal display (LCD), a cathode ray tube (CRT), a plasma display, a light emitting diode (LED) display, and any combinations thereof. Display adapter 1452 and display device 1436 may be utilized in combination with processor 1404 to provide graphical representations of aspects of the present disclosure. In addition to a display device, computer system 1400 may include one or more other peripheral output devices including, but not limited to, an audio speaker, a printer, and any combinations thereof. Such peripheral output devices may be connected to bus 1412 via a peripheral interface 1456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for overvoltage protection in an electric vehicle, the system comprising:
    a connector including one or more conductors coupled to one or more energy storage elements;
    an electric aircraft including:
        one or more ports coupled to the one or more conductors of the connector;
        an overvoltage protection device including:
            one or more sensors configured to detect at least an output voltage of the connector to output an analog signal and a digital signal each indicating the output voltage of the connector; and
            a controller communicatively connected to the one or more sensors,
        wherein the controller is configured to:
            determine an overvoltage output;
            determine, via the digital signal and a digital comparator, whether the output voltage of the connector exceeds the overvoltage output;
            determine, via the analog signal and an analog comparator, whether the output voltage of the connector exceeds the overvoltage output; and
            activate the overvoltage protection device in response to one of the analog comparator and the digital comparator indicating the output voltage of the connector exceeds the overvoltage output.

2. The system of claim 1, wherein the one or more sensors further detect an output current of the connector.

3. The system of claim 2, wherein the controller is further configured to compare the output current to a maximum current level.

4. The system of claim 2, wherein the controller is further configured to compare the output current to a maximum grid current level of an electric grid, and to activate the overvoltage protection device in response to the output current exceeding the maximum grid current level.

5. The system of claim 2, wherein the controller is further configured to compare the output current to a maximum current level of the electric aircraft, and to activate the overvoltage protection device in response to the output current exceeding the maximum current level of the electric aircraft.

6. The system of claim 1, wherein one or more conductors include at least one direct current conductor configured to conduct a direct current.

7. The system of claim 1, wherein the one or more conductors include at least one alternating current conductor configured to conduct an alternating current.

8. The system of claim 1, wherein the overvoltage protection device is configured to disconnect electrical power within the system upon activation by the controller.

9. The system of claim 1, wherein the electric aircraft is configured to charge an electric grid via the one or more ports.

10. A method for overvoltage protection in an electric vehicle, the method comprising:
    conducting, by one or more conductors of a connector, output voltage and output current to one or more ports of an electric aircraft, wherein the one or more conductors are coupled one or more energy storage elements;
    detecting, by one or more sensors, at least an output voltage of the connector to output an analog signal and a digital signal each indicating the output voltage of the connector;
    determining, by a controller, an overvoltage output;
    determining, via the digital signal and a digital comparator, whether the output voltage of the connector exceeds the overvoltage output;
    determining, via the analog signal and an analog comparator, whether the output voltage of the connector exceeds the overvoltage output, and
    activating, by the controller, an overvoltage protection device in response to one of the analog comparator and the digital comparator indicating the output voltage of the connector exceeds the overvoltage output.

11. The method of claim 10, wherein the one or more sensors further detect an output current of the connector.

12. The method of claim 11, wherein the controller is further configured to compare the output current to a maximum current level.

13. The method of claim 11, further comprising comparing, by the controller, the output current to a maximum grid current level of an electric grid, and activating the overvoltage protection device in response to the output current exceeding the maximum grid current level.

14. The method of claim 11, further comprising comparing, by the controller, the output current level to a maximum current level of the electric aircraft, and activating the overvoltage protection device in response to the output current exceeding the maximum current level of the electric aircraft.

15. The method of claim 10, wherein activating the overvoltage protection device further includes disconnecting electrical power within the system in response to one of the analog comparator and the digital comparator indicating the output voltage of the connector exceeds the overvoltage output.

16. The method of claim 10, wherein the conductor includes at least one direct current conductor configured to conduct a direct current.

17. The method of claim 10, wherein the conductor includes at least one alternating current conductor configured to conduct an alternating current.

18. The method of claim 10, further comprising charging, via the one or more ports of the electric aircraft, an electric grid.

* * * * *